(12) United States Patent
Bhamri et al.

(10) Patent No.: US 12,557,094 B2
(45) Date of Patent: Feb. 17, 2026

(54) SIGNALING UNAVAILABILITY OF UPLINK AND DOWNLINK RESOURCES

(71) Applicant: Lenovo (Singapore) Pte. Ltd., New Tech Park (SG)

(72) Inventors: Ankit Bhamri, Rödermark (DE); Hossein Bagheri, Urbana, IL (US); Hyejung Jung, Northbrook, IL (US); Karthikeyan Ganesan, Kronberg im Taunus (DE); Alexander Johann Maria Golitschek Edler von Elbwart, Darmstadt (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 401 days.

(21) Appl. No.: 18/016,564

(22) PCT Filed: Jul. 14, 2021

(86) PCT No.: PCT/IB2021/056359
§ 371 (c)(1),
(2) Date: Jan. 17, 2023

(87) PCT Pub. No.: WO2022/013783
PCT Pub. Date: Jan. 20, 2022

(65) Prior Publication Data
US 2024/0015729 A1    Jan. 11, 2024

Related U.S. Application Data

(60) Provisional application No. 63/051,786, filed on Jul. 14, 2020.

(51) Int. Cl.
*H04W 72/1263* (2023.01)
*H04W 72/23* (2023.01)
(Continued)

(52) U.S. Cl.
CPC ....... *H04W 72/1263* (2013.01); *H04W 72/23* (2023.01); *H04W 72/232* (2023.01); *H04W 72/566* (2023.01); *H04W 74/0841* (2013.01)

(58) Field of Classification Search
CPC .......... H04W 72/1263; H04W 72/232; H04W 72/23; H04W 72/566; H04W 74/0841
See application file for complete search history.

(56) References Cited

U.S. PATENT DOCUMENTS

2018/0279360 A1 * 9/2018 Park .................... H04W 72/23
2019/0098612 A1   3/2019 Babaei et al.
(Continued)

FOREIGN PATENT DOCUMENTS

| EP | 3547780 A1 | 3/2019 |
|---|---|---|
| EP | 3525542 A1 | 8/2019 |
| WO | 2018175420 A1 | 9/2018 |

OTHER PUBLICATIONS

PCT/IB2021/056359, "Notification of Transmittal of the International Search Report and the Written Opinion of the International Searching Authority, or the Declaration", International Searching Authority, Oct. 26, 2021, pp. 1-12.

(Continued)

*Primary Examiner* — Michael K Phillips
(74) *Attorney, Agent, or Firm* — Kunzler Needham & Hilton

(57) ABSTRACT

Apparatuses, methods, and systems are disclosed for unified signaling for Downlink Preemption Indication ("DL PI") and Uplink Cancellation Indication ("UL CI"). One apparatus in a mobile communication network includes a processor and a transceiver that receives first signaling information from a Radio Access Network ("RAN") device to schedule first communication resources and receives second signaling information after receiving the first signaling information. Here, the processor determines unavailability (Continued)

of at least one set of uplink resources and unavailability of at least one set of downlink resources from the second signaling information on the scheduled first communication resources.

20 Claims, 15 Drawing Sheets

(51) Int. Cl.
*H04W 72/232* (2023.01)
*H04W 72/566* (2023.01)
*H04W 74/0833* (2024.01)

(56) References Cited

U.S. PATENT DOCUMENTS

| | | | |
|---|---|---|---|
| 2019/0306801 A1* | 10/2019 | Zhou | H04W 52/04 |
| 2019/0306848 A1* | 10/2019 | Zhou | H04W 72/23 |
| 2020/0008216 A1* | 1/2020 | Iyer | H04W 72/23 |
| 2020/0037305 A1* | 1/2020 | Yang | H04L 5/0035 |
| 2020/0259601 A1* | 8/2020 | Zhou | H04L 5/0085 |
| 2021/0029646 A1* | 1/2021 | Park | H04W 52/367 |
| 2021/0100029 A1* | 4/2021 | Lei | H04W 72/0446 |
| 2021/0160879 A1* | 5/2021 | Lin | H04W 72/0453 |
| 2021/0259002 A1* | 8/2021 | Hosseini | H04W 74/006 |
| 2021/0352678 A1* | 11/2021 | Taherzadeh Boroujeni | H04W 72/1268 |
| 2022/0386355 A1* | 12/2022 | Yi | H04W 72/569 |
| 2023/0058058 A1* | 2/2023 | Dai | H04L 5/0053 |

OTHER PUBLICATIONS

Qualcomm, "New WID on Extending current NR operation to 71 GHz", 3GPP TSG RAB Meeting #86 RP-193229, Dec. 9-12, 2019, pp. 1-5.

Intel Corp., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NG-RAN; F1 application protocol (F1AP) (Release 16)", 3GPP TS 38.473 V16.1.0, Mar. 2020, pp. 1-240.

* cited by examiner

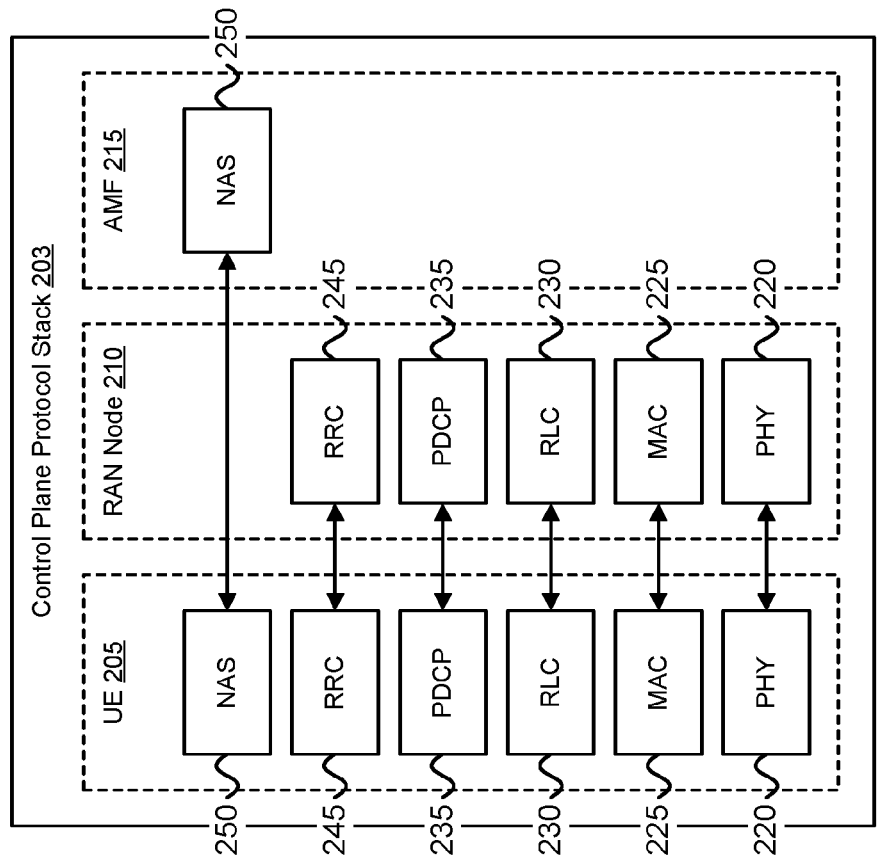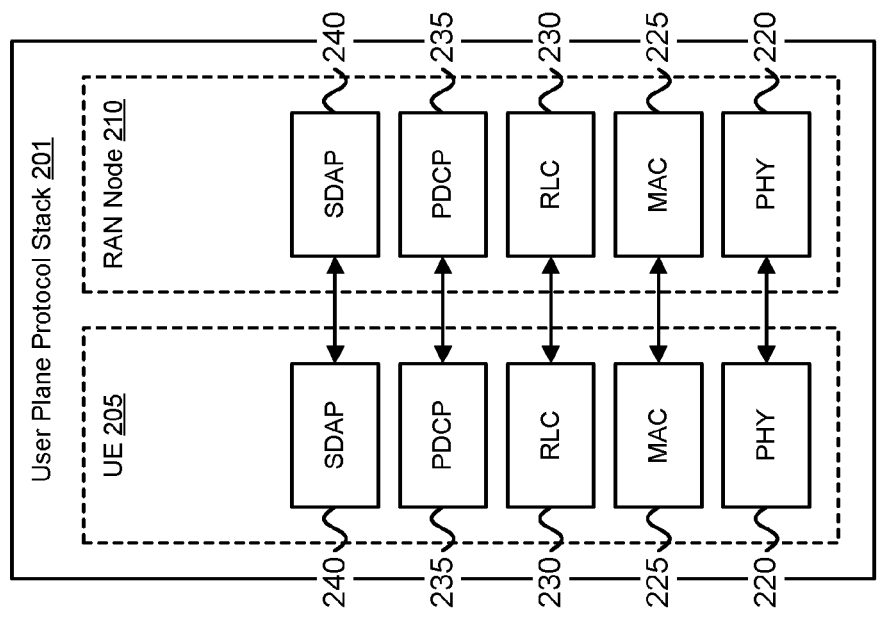
FIG. 2

PreemptionCancellation IE 1000

```
-- ASN1START
-- TAG-PREEMPTIONCANCELLATION-START

PreemptionCancellation-r17 ::=      SEQUENCE {
    pci-RNTI-r17                        RNTI-Value,
    dci-PayloadSizeForPCI-r17           INTEGER (0..maxPCI-DCI-PayloadSize-r17),
    pci-ConfigurationPerServingCell-r17 SEQUENCE (SIZE (1..maxNrofServingCells)) OF PCI-
                                            ConfigurationPerServingCell-r17,
    ...
}

PCI-ConfigurationPerServingCell-r17 ::= SEQUENCE {
    servingCellId                       ServCellIndex,
    positionInDCI-r17                   INTEGER (0..maxCI-DCI-PayloadSize-r17-1),
    positionInDCI-ForSUL-r17            INTEGER (0..maxCI-DCI-PayloadSize-r17-1)
                                            OPTIONAL, -- Cond SUL-only
    pci-PayloadSize-r17                 ENUMERATED {n1, n2, n4, n7, n8, n14, n16, n28, n32, n56,
n112},
    timeFrequencyRegion-r17             SEQUENCE {
    timeDurationForPCI-r17                  ENUMERATED {n2, n4, n7, n14, n28, n56}
    timeWindowForPCI-r17                    timeWindowList
    timeGranularityForPCI-r17               ENUMERATED {n1, n2, n4, n7, n14, n28},
    frequencyRegionForPCI-r17               INTEGER (0..37949),
    ...
    }
}

-- TAG-PREEMPTIONCANCELLATION-STOP
-- ASN1STOP
```

FIG. 10

SIGNALING UNAVAILABILITY OF UPLINK AND DOWNLINK RESOURCES

CROSS-REFERENCE TO RELATED APPLICATIONS

This application claims priority to U.S. Provisional Patent Application No. 63/051,786 entitled "UNIFIED DCI FORMAT FOR UL CANCELLATION INDICATION AND DL PREEMPTION INDICATION" and filed on Jul. 14, 2020 for Ankit Bhamri, Hossein Bagheri, Hyejung Jung, Karthikeyan Ganesan, Alexander Golitschek, and Ali Ramadan Ali, which application is incorporated herein by reference.

FIELD

The subject matter disclosed herein relates generally to wireless communications and more particularly relates to unified signaling to indicate the cancellation of at least some part of already scheduled uplink transmission and also to indicate the pre-emption of at least some part of already scheduled downlink transmission.

BACKGROUND

In certain wireless communications networks, multiple downlink control information formats may be used for indicating related to multiple downlink and uplink transmissions. Such networks may require the device to monitor these multiple downlink control information formats and this may need quite high device processing and capability.

BRIEF SUMMARY

Disclosed are procedures for unified signaling for Downlink ("DL") Preemption Indication ("PI") and Uplink ("UL") Cancellation Indication ("CI"). Said procedures may be implemented by apparatus, systems, methods, or computer program products.

One method of a User Equipment ("UE") includes receiving first signaling information from a Radio Access Network ("RAN") device to schedule first communication resources and receiving second signaling information after receiving the first signaling information, where the second signaling information indicates both unavailability of at least one set of uplink resources and unavailability of at least one set of downlink resources on the scheduled first communication resources.

One method of a RAN node includes transmitting first signaling information that schedule first communication resources to a UE and transmitting second signaling information to the UE after transmitting the first signaling information, where the second signaling information indicates both unavailability of at least one set of uplink resources and unavailability of at least one set of downlink resources on the scheduled first communication resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of a 5G New Radio ("NR") protocol stack;

FIG. 10 is a diagram illustrating one embodiment of a PreemptionCancellation information element;

DETAILED DESCRIPTION

Figure 1:
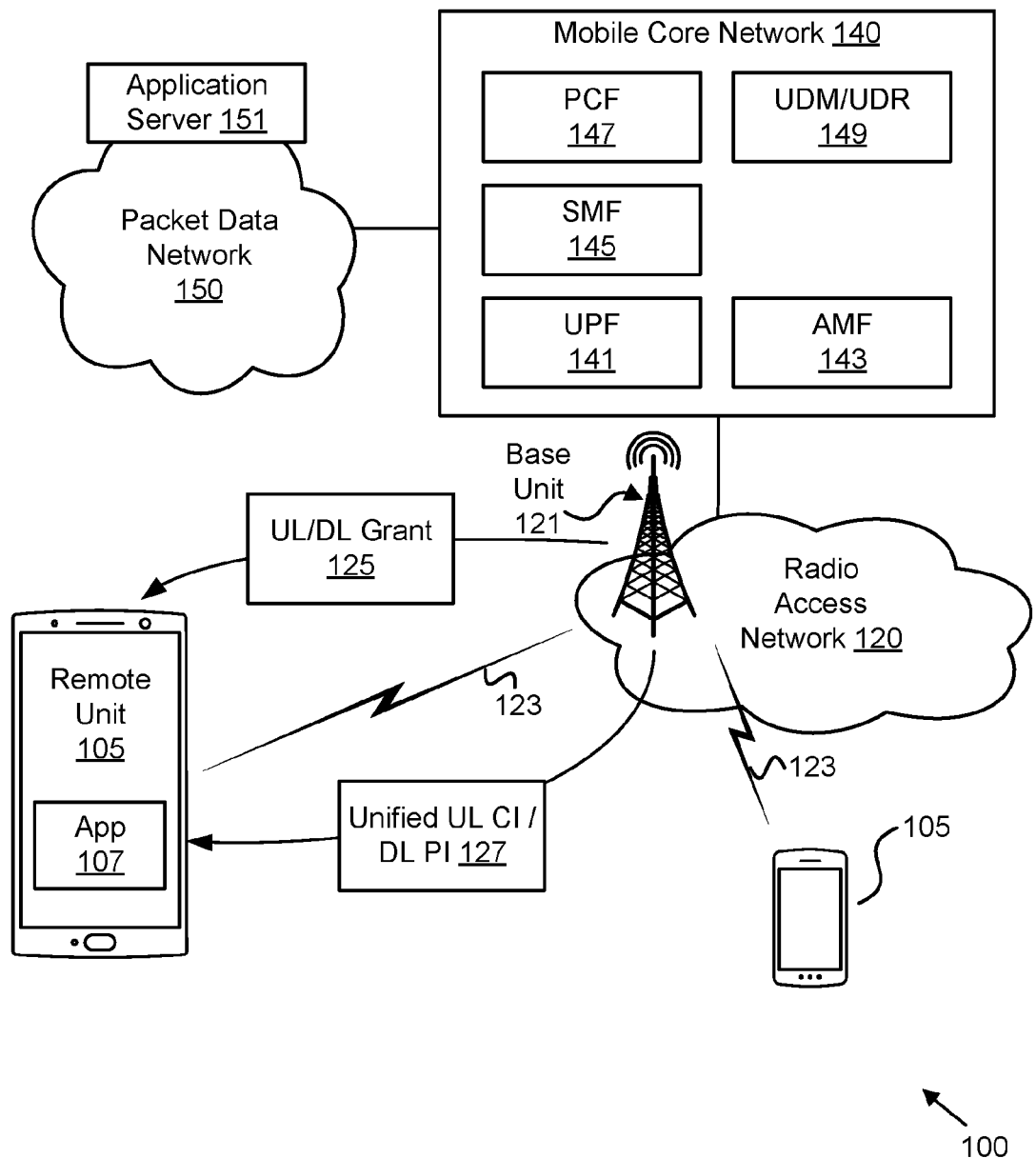
FIG. 1 is a schematic block diagram illustrating one embodiment of a wireless communication system for unified signaling for Downlink ("DL") Preemption Indication ("PI") and Uplink ("UL") Cancellation Indication ("CI")

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the FIGURES illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated FIGURES.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for new unified Downlink Control Information ("DCI") format to indicate the cancellation of at least some part of an already scheduled (or on-going) uplink transmission and also to indicate the pre-emption of at least some part of the already scheduled (or on-going) downlink transmission to the User Equipment ("UE"). In certain embodiments, the new unified DCI format for use at high subcarrier spacing (such as 480 kHz, 960 kHz or higher). In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

To support Third Generation Partnership Project ("3GPP") 5G New Radio ("NR") between 52.6 GHz and 71 GHz (or even higher frequencies), the numerology, including subcarrier spacing ("SCS") and/or channel bandwidth ("BW"), used at higher radio frequencies may be increased. However, at the physical layer the new numerology or numerologies (i.e., μ value in 3GPP TS 38.211) for operation in this frequency range has impact on physical signals/channels and may additionally impact timeline related aspects adapted to each of the new numerologies, e.g., BWP and beam switching times, Hybrid Automatic Repeat Request ("HARQ") scheduling, UE processing, preparation, and computation times for Physical Downlink Shared Channel ("PDSCH"), Physical Uplink Shared Channel ("PUSCH"), Sounding Reference Signal ("SRS") and Channel State Information ("CSI"), respectively.

The present disclosure addresses monitoring issues with Physical Downlink Control Channel ("PDCCH") for DCI formats when higher subcarrier spacing values such as 480 kHz, 960 kHz and beyond are utilized. When high SCS will be used, PDCCH monitoring can become quite frequent due to shorter slot length duration. In particular, the PDCCH monitoring capacity reduces quite significantly with increased subcarrier spacing. Because operation at frequencies of 52.6 GHz or higher, will likely require higher subcarrier spacing values (e.g., 480 kHz, 960 kHz and beyond) it is expected that PDCCH monitoring capability will be significantly reduced as compared to NR operation.

The present disclosure addresses how to reduce the PDCCH monitoring for group-common DCI used for cancellation indication to UEs with lower priority scheduled UL transmission and the PDCCH monitoring for group-common DC used for pre-emption indication to UEs with lower priority scheduled DL transmission, when a higher priority transmission is scheduled to be transmitted on overlapping resources.

A DCI transports downlink control information for one or more cells with one RNTI. The DCI formats defined in table 7.3.1-1 are supported in NR.

TABLE 1

DCI formats

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g., the most significant bit of the first field is mapped to $a_0$.

If the number of information bits in a DCI format is less than 12 bits, zeros shall be appended to the DCI format until the payload size equals 12.

The size of each DCI format is determined by the configuration of the corresponding active bandwidth part of the scheduled cell and may be adjusted, if necessary.

In some embodiments, DCI format 2_1 is used to indicate preemption of DL resources to accommodate high priority (i.e., URLLC) transmission/reception. Regarding procedure of monitoring PDCCH candidates for DCI format 2_1, if a UE is provided with the DownlinkPreemption information element ("IE"), then the UE is configured with an INT-RNTI provided by parameter int-RNTI for monitoring PDCCH conveying DCI format 2_1. The UE is additionally configured with:

- a set of serving cells by parameter int-ConfigurationPerServingCell that includes a set of serving cell indexes provided by parameter corresponding servingCellId and a corresponding set of locations for fields in DCI format 2_1 by parameter positionInDCI
- an information payload size for DCI format 2_1 by parameter dci-PayloadSize
- an indication granularity for time-frequency resources by parameter timeFrequencySet If a UE detects a DCI format 2_1 for a serving cell from the configured set of serving cells, the UE may assume that no transmission to the UE is present in Physical Resource Blocks ("PRBs") and in symbols that are indicated by the DCI format 2_1, from a set of PRBs and a set of symbols of the last monitoring period. The indication by the DCI format 2_1 is not applicable to receptions of Synchronization Signal/Physical Broadcast Channel ("SS/PBCH") blocks. The set of PRBs is equal to the active DL BWP and includes $B_{INT}$ PRBs.

If a UE detects a DCI format 2_1 in a PDCCH transmitted in a Control Resource Set ("CORESET") in a slot, the set of symbols is the last $N_{symb}^{slot} \cdot T_{INT} \cdot 2^{\mu-\mu_0}$ symbols prior to the first symbol of the CORESET in the slot where $T_{INT}$ is the PDCCH monitoring periodicity provided by the value of parameter monitoringSlotPeriodicityAndOffset, $N_{symb}^{slot}$ is the number of symbols per slot, $\mu$ is the SCS configuration for a serving cell with mapping to a respective field in the DCI format 2_1, $\mu_{INT}$ is the SCS configuration of the DL BWP where the UE receives the PDCCH with the DCI format 2_1. If the UE is provided tdd-UL-DL-ConfigurationCommon, symbols indicated as uplink by tdd-UL-DL-ConfigurationCommon are excluded from the last $N_{symb}^{slot} \cdot T_{INT} \cdot 2^{\mu-\mu_{INT}}$ symbols prior to the first symbol of the CORESET in the slot. The resulting set of symbols includes a number of symbols that is denoted as $N_{INT}$.

The UE does not expect to be provided values of $\mu$, $\mu_{INT}$, and $T_{INT}$ resulting to a value of $N_{symb}^{slot} \cdot T_{INT} \cdot 2^{\mu-\mu_{INT}}$ that is not an integer. The UE does not expect to be configured by parameter monitoringSymbolsWithinSlot with more than one PDCCH monitoring occasion for DCI format 2_1 in a slot. A UE is provided the indication granularity for the set of PRBs and for the set of symbols by parameter timeFrequencySet.

If the value of parameter timeFrequencySet is 'set0', 14 bits from MSB of a field in DCI format 2_1 have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups includes $\lfloor N_{INT}/14 \rfloor$ symbols, a bit value of 0 indicates transmission to the UE in the corresponding symbol group and a bit value of 1 indicates no transmission to the UE in the corresponding symbol group.

If the value of timeFrequencySet is 'set1', 7 pairs of bits from MSB of a field in the DCI format 2_1 have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups includes $\lfloor N_{INT}/7 \rfloor$ symbols, a first bit in a pair of bits for a symbol group is applicable to the subset of first $\lceil B_{INT}/2 \rceil$ PRBs from the set of $B_{INT}$ PRBs, a second bit in the pair of bits for the symbol group is applicable to the subset of last $\lfloor B_{INT}/2 \rfloor$ PRBs from the set of $B_{INT}$ PRBs, a bit value of 0 indicates transmission to the UE in the corresponding symbol group and subset of PRBs, and a bit value of 1 indicates no transmission to the UE in the corresponding symbol group and subset of PRBs.

DCI format 2_1 is used for notifying the PRB(s) and OFDM symbol(s) where UE may assume no transmission is intended for the UE.

The following information is transmitted by means of the DCI format 2_1 with CRC scrambled by INT-RNTI.

Pre-emption indication 1, Pre-emption indication 2, . . . , Pre-emption indication N.

The size of DCI format 2_1 is configurable by higher layers up to 126 bits. Each pre-emption indication is 14 bits.

In some embodiments, DCI format 2_4 is used to indicate cancellation of already scheduled UL transmission to accommodate high priority URLLC transmission/reception. Regarding procedure of monitoring PDCCH candidates for DCI format 2_4, if a UE is provided a UplinkCancellation IE, the UE is provided a CI-RNTI by parameter ci-RNTI for monitoring PDCCH candidates for a DCI format 2_4. The UplinkCancellation IE additionally provides to the UE

- a set of serving cells, by parameter ci-ConfigurationPerServingCell, that includes a set of serving cell indexes and a corresponding set of locations for fields in DCI format 2_4 by parameter positionInDCI
- a number of fields in DCI format 2_4, by parameter positionInDCI-forSUL, for each serving cell for a SUL carrier for a SUL carrier, if the serving cell is configured with a SUL carrier for SUL of a serving cell if the serving cell configured with SUL
- an information payload size for DCI format 2_4 by parameter dci-PayloadSize-forCI
- an indication for time-frequency resources by parameter timeFrequencyRegion For a serving cell having an associated field in DCI format 2_4, for the field denote by

- $N_{CI}$ a number of bits provided by parameter CI-PayloadSize
- $B_{CI}$ a number of PRBs provided by parameter frequencyRegionforCI in timeFrequencyRegion IE
- $T_{CI}$ a number of symbols, excluding symbols for reception of SS/PBCH blocks and DL symbols indicated by patdd-UL-DL-ConfigurationCommon, is provided by parameter timeDurationforCI in timeFrequencyRegion IE
- $G_{CI}$ a number of partitions for the $T_{CI}$ symbols provided by parameter timeGranularityforCI in timeFrequencyRegion IE $G_{CI}$ sets of bits from the $N_{CI}$ bits have a one-to-one mapping with $G_{CI}$ groups of symbols where each of the first $G_{CI}-T_{CI}+\lfloor T_{CI}/G_{CI} \rfloor \cdot G_{CI}$ groups includes $\lfloor T_{CI}/G_{CI} \rfloor$ symbols and each of the remaining $T_{CI}-\lfloor T_{CI}/G_{CI} \rfloor \cdot G_{CI}$ groups includes $\lceil T_{CI}/G_{CI} \rceil$ symbols. A UE determines a symbol duration with respect to a SCS configuration of an active DL BWP where the UE monitors PDCCH for DCI format 2_4 detection.

For a group of symbols, $N_{BI}=N_{CI}/G_{CI}$ bits from each set of bits have a one-to-one mapping with $N_{BI}$ groups of PRBs where each of the first $N_{BI}-B_{CI}+\lfloor B_{CI}/N_{BI} \rfloor \cdot N_{BI}$ groups includes $\lfloor B_{CI}/N_{BI} \rfloor$ PRBs and each of the remaining $B_{CI}-\lfloor B_{CI}/N_{BI} \rfloor \cdot N_{BI}$ groups includes $\lceil B_{CI}/N_{BI} \rceil$ PRBs. A UE determines a first PRB index as $N_{RFR}^{start}=O_{carrier}+RB_{start}$ and a number of contiguous RBs as $N_{RFR}^{size}=L_{RB}$ from frequencyRegionforCI that indicates an offset $RB_{start}$ and a length $L_{RB}$ as RIV according to 3GPP TS 38.214, and from offsetToCarrier in FrequencyInfoUL-SIB that indicates $O_{carrier}$ for a SCS configuration of an active DL BWP where the UE monitors PDCCH for DCI format 2_4 detection.

An indication by a DCI format 2_4 for a serving cell is applicable to a PUSCH transmission or an SRS transmission on the serving cell. For the serving cell, the UE determines the first symbol of the $T_{CI}$ symbols to be the first symbol that is after $T_{proc,2}+d$ from the end of a PDCCH reception where the UE detects the DCI format 2_4. $T_{proc,2}$ corresponds to the PUSCH processing capability 2 assuming $d_{2,1}=0$ with $\mu$ being the smallest SCS configuration between the SCS configurations of the PDCCH and of a PUSCH transmission or of an SRS transmission on the serving cell. The UE does not expect to cancel the PUSCH transmission or the SRS transmission before a corresponding symbol that is $T_{proc,2}$ after a last symbol of a CORESET where the UE detects the DCI format 2_4.

A UE that detects a DCI format 2_4 for a serving cell cancels a PUSCH transmission, or a repetition of a PUSCH transmission if the PUSCH transmission is with repetitions, or an SRS transmission on the serving cell if, respectively,
- a group of symbols, from the $T_{CI}$ symbols, has a corresponding bit value of '1' in the DCI format 2_4 and includes a symbol of the (repetition of the) PUSCH transmission or of the SRS transmission, and
- a group of PRBs, from the $B_{CI}$ PRBs, has a corresponding bit value of '1' in the DCI format 2_4 and includes a PRB of the (repetition of the) PUSCH transmission or of the SRS transmission, where
- the cancellation of the (repetition of the) PUSCH transmission includes all symbols from the earliest symbol of the (repetition of the) PUSCH transmission that are in one or more groups of symbols having corresponding bit values of '1' in the DCI format 2_4;
- the cancellation of the SRS transmission includes only symbols that are in one or more groups of symbols having corresponding bit values of '1' in the DCI format 2_4.

Currently supported DCI formats for group-common indication to the UEs for cancellation indication of UL transmission and pre-emption indication of DL transmissions are specified as below:

DCI format 2_4 is used for notifying the PRB(s) and OFDM symbol(s) where UE cancels the corresponding UL transmission from the UE.

The following information is transmitted by means of the DCI format 2_4 with CRC scrambled by CI-RNTI.

Cancellation indication 1, Cancellation indication 2, . . . , Cancellation indication N.

The size of DCI format 2_4 is configurable by higher layers parameter dci-PayloadSize-forCI up to 126 bits. The number of bits for each cancellation indication is configurable by higher layer parameter CI-PayloadSize. For a UE, there is at most one cancellation indication for an UL carrier.

Described herein is a new DCI format used to signal both the downlink pre-emption indication and the uplink cancellation indication to allow higher priority downlink and uplink transmission, respectively, on the partially or completely overlapping resources with already scheduled downlink and uplink transmission. Also described are DL pre-emption and UL pre-emption techniques for multi-slot DL and/or UL transmissions.

Beneficially, the new DCI format reduces the PDCCH monitoring for separate DCIs for DL pre-emption and UL cancellation when high SCS value is utilized, and UE is configured to monitor unified DCI for signaling both DL PI and UL CI.

FIG. 1 depicts a wireless communication system 100 for unified signaling for DL PI and UL CI, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit 121 may send a UL and/or DL grant 125 to the remote unit 105 that schedules communication resources. However, at a later time the base unit 121 may send a unified UL cancellation and DL preemption indication 127 which indicates both unavailability of at least one set of uplink resources and unavailability of at least one set of downlink resources on the scheduled first communication resources.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM'") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for unified signaling for DL PI and UL CI apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the below described solutions/methods are also equally applicable to other mobile communication systems supporting unified signaling for DL PI and UL CI.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

With very high SCS such as 480 kHz and 960 kHz, the PDCCH monitoring capability of the UE 205 is an issue. If a UE 205 is required to monitor multiple DCI formats in every slot with high SCS, then further increased UE capability might be needed. However, with the intention to not impact the UE capability, other solutions to limit the PDCCH monitoring requirements are pursued.

Figure 3:
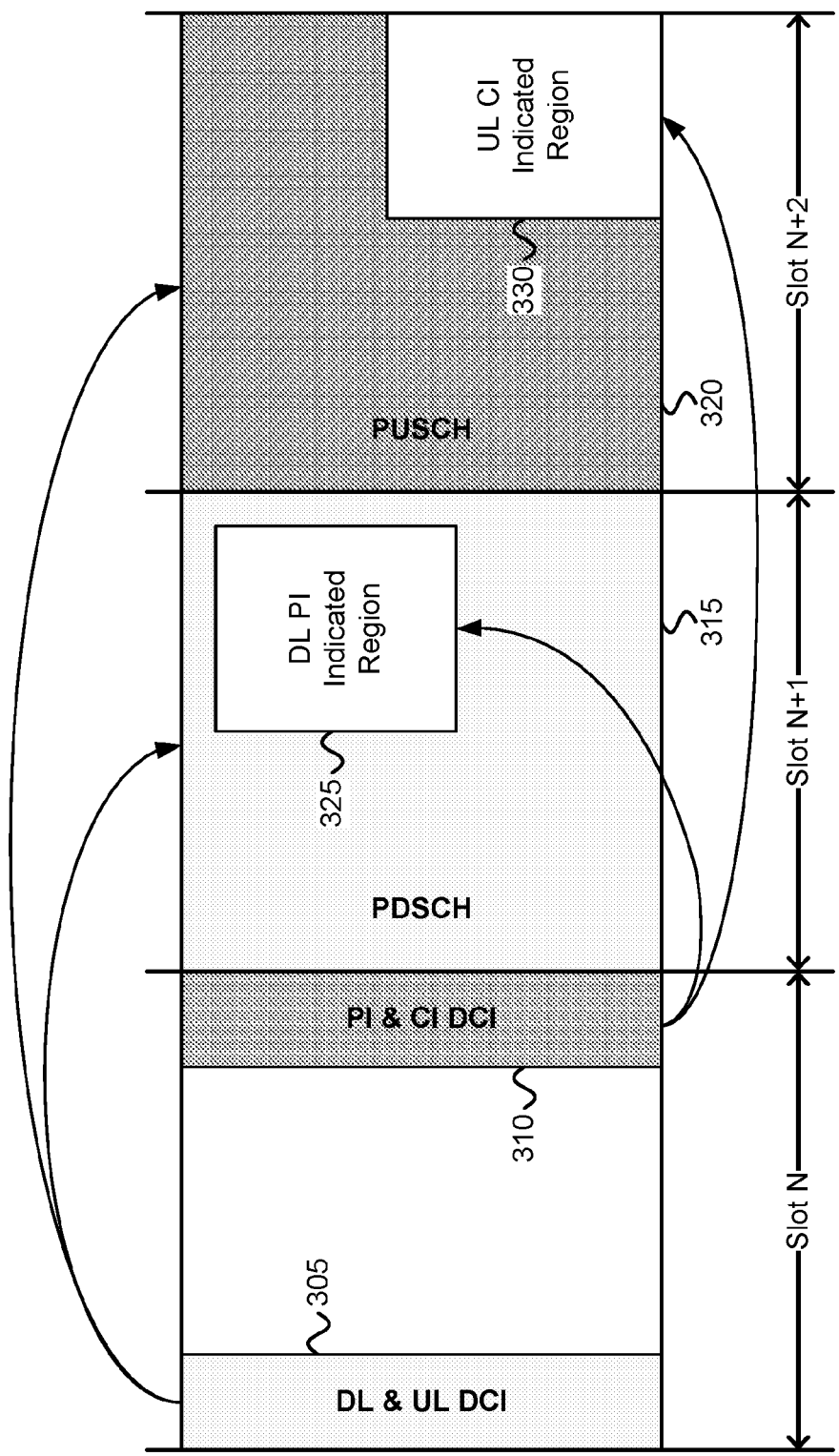
FIG. 3 is a diagram illustrating one embodiment of Downlink Control Information ("DCI") format for unified signaling for DL PI and UL CI.

FIG. 3 depicts an example scenario 300 of UL cancellation indication ("CI") and DL preemption indication ("PI") using the new unified DCI format defined herein. This new unified DCI format may be used with high subcarrier spacing (such as 480 kHz, 960 kHz) to indicate/trigger the cancellation of at least some part of the already scheduled or on-going uplink transmission and also to indicate the preemption of at least some part of the already scheduled or transmitted downlink transmission to the UE.

In the scenario 300, a UE, such as the UE 205, receives a DCI 305 in symbols 0 and 1 of slot N, where the DCI 305 schedules resources 315 for DL transmission (e.g., PDSCH) in slot N+1 and schedules resources 320 for UL transmission (e.g., PUSCH) in slot N+2. The received DCI is exemplary of first signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

Using a single, unified DCI containing both the UL resource grant and the DL resource grant is described in co-pending international application PCT/IB2021/055778 entitled "CONTROL INFORMATION THAT SCHEDULES OR ACTIVATES MULTIPLE TRANSMISSIONS" and filed on 28 Jun. 2021 for Ankit Bhamri, Alexander Golitschek, Karthikeyan Ganesan, Hyejung Jung, and Ali Ramadan Ali, which application is incorporated herein by reference. Using a single, unified DCI containing both the UL resource grant and the DL resource grant is also described in co-pending international application PCT/IB2021/055767 entitled "RESTRICTIONS BASED ON A CONFIGURED NUMEROLOGY" and filed on 28 Jun. 2021 for Ankit Bhamri, Hyejung Jung, Alexander Golitschek, Karthikeyan Ganesan, and Ali Ramadan Ali, which application is incorporated herein by reference.

Additionally, the UE 205 also receives the new unified DCI format 310 for preemption and cancellation indication in symbol 12 and 13 of slot N, which indicates to the UE 205 both A) at least one grid 325 of time-frequency resources for DL preemption (i.e., the DL PI indicated region) and B) at least one additional grid 330 of time-frequency resources for UL cancellation (i.e., the UL PI indicated region). Here, the DL preemption may be due to another, higher priority UE being scheduled for DL reception on resources that overlap with the those scheduled to the UE 205 in the DCI 305. Similarly, the UL cancellation may be due to another, higher priority UE being scheduled for UL transmission on resources that overlap with the those scheduled to the UE 205 in the DCI 305.

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 315 (PDSCH) and UL resources 320 (PUSCH) are each a dynamic grant scheduled using the DCI 305, in other embodiments one or both of the DL resources 315 (PDSCH) and UL resources 320 (PUSCH) may be a configured grant (i.e., semi-statically/semi-persistently scheduled resources). Here, the same principle applies that the new DCI format 310 indicates both a cancellation of already scheduled UL resources and a preemption of already scheduled DL resources.

According to embodiments of a first solution, a new group-common unified DCI format is used to signal both the DL preemption indication ("DL PI") and UL cancellation indication ("UL CI") to a UE 205 (with already scheduled DL and UL transmission), when other high priority traffic DL and UL is scheduled for other UE(s), respectively, on partial or completely overlapping time-frequency resources. In an example, the presence of UL CI and/or DL PI in unified GC-DCI format can be configurable for a search space.

In one example to reduce the DCI size, the frequency granularity of the cancellation/preemption indication for SCS larger than a threshold (e.g., SCS larger than 480 kHz) is the whole BWP or half of the BWP. In a related example, the frequency granularity of the cancellation/preemption indication for SCS larger than a threshold (e.g., SCS larger than 480 kHz) is coarser (such as the whole BWP) when the DCI indicates both UL CI and DL PI compared to the case that the DCI indicates only one of UL CI or DL PI wherein the frequency granularity can be finer (such as half of the BWP).

In one example, the UE 205 is configured to monitor the group-common unified DCI format when the UL SCS and DL SCS associated with the group-common DCI are substantially the same or similar, e.g., the ratio of UL SCS to DL SCS is smaller than a pre-determined threshold. In another example, the UE 205 is configured to monitor the group-common unified DCI format when the ratio of UL SCS to DL SCS is larger than a pre-determined threshold.

Figure 4A:
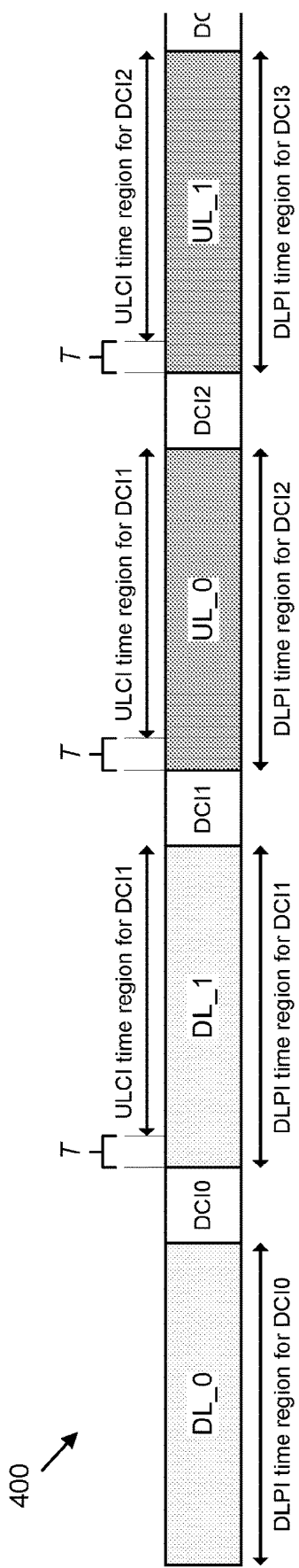
FIG. 4A is a diagram illustrating one embodiment of time regions associated to UL CI and DL PI.

FIG. 4A depicts time regions 400 associated to UL CI and DL PI, according to the first solution. A DL PI time region is determined to be symbols between the two GC-DCI monitoring occasions, wherein the end of the DL PI time region is the first symbol of the Control Resource Set ("CORESET") in which the DL PI indication in the GC-DCI is received. A UL CI time region is determined to be the symbols from the first symbol that is after "T" symbols from the end of the GC-DCI reception where the UE 205 detects the GC-DCI format ('T' is an offset parameter depending on the UL processing timeline).

The following are examples of group-common unified DCI format, according to the first solution.

In example 'A', the time region for which the DL PI indicated via the unified GC-DCI is applicable (referred to as a first time region or DL PI time region) is derived from the periodicity of the unified GC-DCI or based on a first RRC configuration, and the time region for which the UL CI indicated via the unified GC-DCI is applicable (referred to as a second time region, or UL CI time region) is derived from the periodicity of the unified GC-DCI or based on a second RRC configuration In a related example, 'Alt. A,' the first and the second RRC configuration are the same (e.g., a same configuration parameter such as a single time-region duration signaled via RRC signaling is applicable to both DL PI and UL CI).

In example 'B' (also related to example 'A'), the end of the first time region is determined based on the GC-DCI reception (e.g., beginning/end of the reception)/GC-DCI monitoring occasion/resources where GC-DCI is monitored/ CORESET where the GC-DCI is transmitted (such as the last/first symbol of the CORESET), and the beginning of the second time region is determined based on the GC-DCI reception (e.g., end/beginning of the reception)/GC-DCI monitoring occasion/resources where GC-DCI is monitored CORESET where the GC-DCI transmitted (such as the first/last symbol of the CORESET) (and possibly an additional time offset after the reception of the GC-DCI).

In example 'C', according to an UL-DL configuration/ arrangement of symbols (e.g., as indicated by tdd-UL-DL-ConfigurationCommon), the GC-DCI may only contain one of UL CI and DL PI for a serving cell. For instance, in FIGURE below, GC-DCI 0 only indicates DL PI, GC-DCI 1 indicates both DL PI and UL CI, and GC-DCI 2 only indicates UL CI.

In one implementation, the UE 205 is not expected to receive GC-DCI 0 indicating UL CI with cancellation indication applicable to a subset of symbols, instead of the whole set of symbols of the associated UL CI time region.

In another implementation, the UL CI field in GC-DCI 0 could be repurposed to indicate a finer granularity DL PI indication (e.g., the DL PI field alone provides time indication for preempted DL symbols, and ULPI field indicates for which half of the BWP, the DL preemption is applicable). In an example, the DL PI field in GC-DCI 2 can be used to indicate UCLI for a supplementary carrier. In another example, the DL PI field in GC-DCI 2 can be used to indicate UCLI for another serving cell.

In one implementation, the field length for UL CI and DL PI are related (e.g., UL CI field size equals DL PI size+delta, wherein delta could be '0', a fixed positive integer value or a fixed negative integer value). in another example, there is a joint field for DL PI and UL CI. In one example, the DL PI indication and UL CI indication occur consecutively in a GC-DCI (e.g., there is one positionInDCI RRC field for each serving cell).

There could be a field in GC-DCI indicating whether UL CI or DL PI field is applicable (e.g., or to be used for another purpose). For instance, the RAN node 210 may indicate in GC-DCI 0 that the UL CI field is not applicable.

Figure 4B:
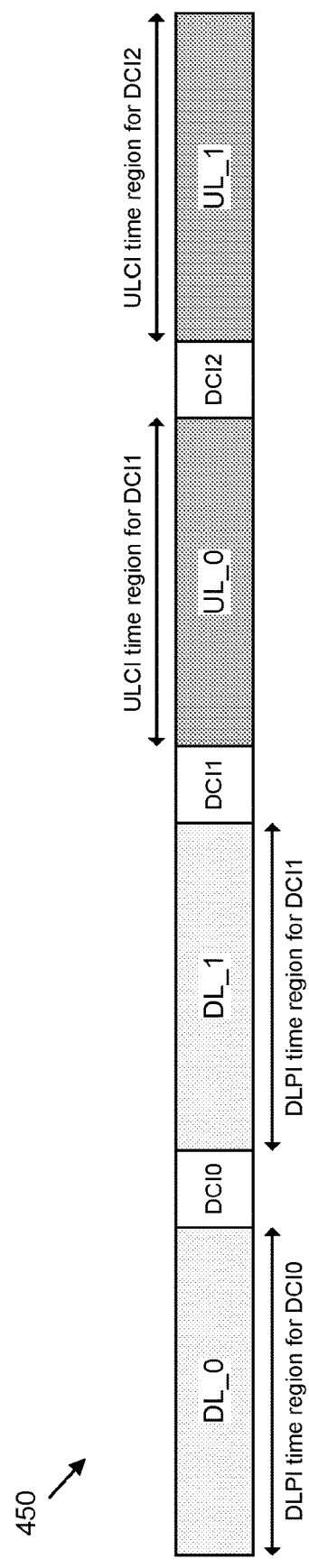
FIG. 4B is a diagram illustrating another embodiment of time regions associated to UL CI and DL PI.

FIG. 4B depicts an example of time regions 450 associations to UL CI and DL PI for a serving cell, according to the first solution. In the depicted example, GC-DCI 0 indicates DL PI only, GC DCI 1 indicates both UL CI and DL PI, and GC-DCI 2 indicates UL CI only. In one implementation, GC-DCI containing unified DLPI/ULCI includes an explicit field indicating the presence or absence of DL PI and UL CI. In another embodiment, an invalid field for DLPI/ULCI may be used to indicate their absence.

In one example, an information payload size for unified DCI format (referred to as "dci-PayloadSize-forCIPI") is signaled (such as by RRC). In another example, an information payload size for unified DCI format is determined based on the information payload size for DL PI (such as dci-PayloadSize) and the information payload size for UL CI (such as dci-PayloadSize-forCI). For instance, the information payload size for the unified DCI format is the sum of the information payload size for DL PI and information payload size for UL CI.

In an example, the UE 205 determines the position of an DLPI/ULCI field based on one or more of dci-PayloadSize-forCIPI, dci-PayloadSize, dci-PayloadSize-forCI, and a size of an UL cancellation indicator of a serving cell (such as CI-PayloadSize). In one implementation, the UE 205 determines the position of a DL PI field in the unified DCI format based on dci-PayloadSize-forCIPI and dci-PayloadSize and the UE 205 determines the position of an UL CI field based on the dci-PayloadSize-forCIPI, dci-PayloadSize-forCI, and CI-PayloadSize.

In an example, in the unified GC-DCI, the UL CI field payload size (such as the one indicated by dci-PayloadSize-forCI/CI-PayloadSize in Rel-16) is smaller/larger than a threshold. For instance, the UL CI field payload size is not larger than a DL PI field size plus an offset (e.g., the offset can be fixed, configurable, determined from a UE 205 capability signaling). In another example, a large value of UL CI field payload size than the one specified in Rel-16/ DCI format 2_4 is not possible in the unified GC-DCI.

In one example, the UL CI is applicable to an UL transmission with overlapping resources with the indicated resources in the UL CI, irrespective of the priority of the UL transmission.

In one example, the UL CI is only applicable to an UL transmission if the UL transmission is scheduled via a DCI sent prior to the UL CI.

In an alternate embodiment, when UE 205 is scheduled with DL and UL transmission for multiple TTIs across one or more slots, then the unified DCI format for DL PI and UL CI is UE-specific, where only a specific UE 205 is required to monitor this DCI, receive first time-frequency resource set that consists of one or multiple time-frequency resources for one or multiple TTIs for DL preemption on respective TTIs and receive a second time-frequency resource set that consists of one or multiple time-frequency resources for one or multiple TTIs for UL cancellation in respective TTIs.

According to embodiments of a second solution, the UE 205 may be required to monitor unified DCI for DL PI and UL CI only when the subcarrier spacing ("SCS") is above a certain threshold value for both DL and UL, where the threshold value for subcarrier spacing can be configured/ indicated to the UE 205 by the RAN node 210. In an alternate embodiment, MAC CE indication is used to activate and/or deactivate the monitoring of unified DCI for DL PI and UL CI. In another embodiment, the monitoring of unified DCI format for DL PI and UL CI is dependent upon the monitoring of other DCI format(s). For example, when a UE 205 is configured/indicated to monitor a unified DCI format for scheduling DL and UL transmissions, then the UE 205 also monitors the new unified DCI format for DL PI and UL CI.

In one example implementation of the second embodiment, whenever a UE 205 is configured/indicated to monitor the unified DCI for DL PI and UL CI, then the UE 205 is not required to monitor at least the two other DCI formats including format 2_1 (DL PI) and format 2_4 (UL CI).

In an example, the UE 205 is configured to monitor the unified DCI format for DL PI and UL CI in a first search space and monitor DCI format 2_1/2_4 in a second search space. In an example, the search spaces should not overlap. In another example, the search spaces can overlap (e.g., in time or time-frequency).

Figure 5:
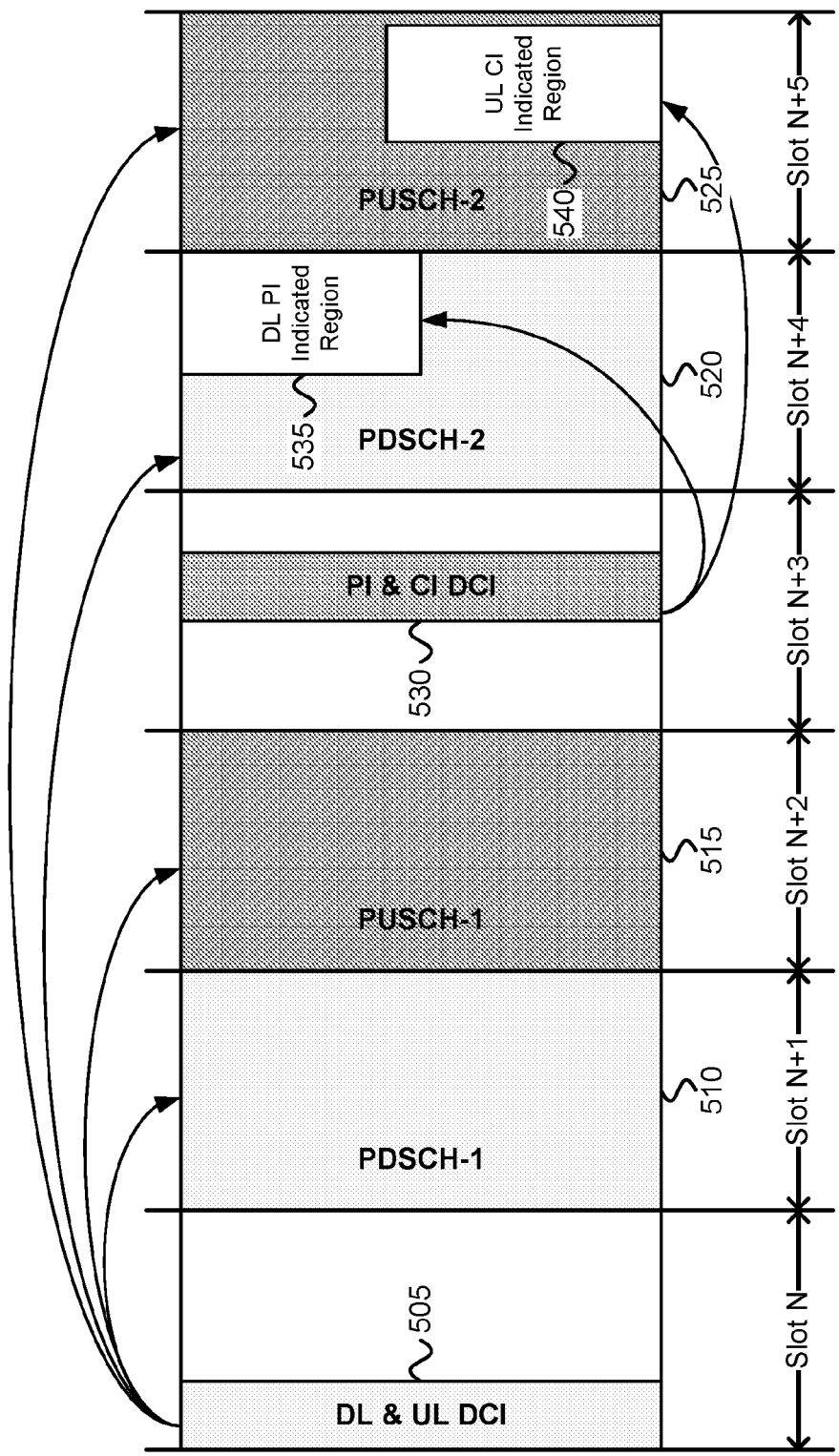
FIG. 5 depicts a diagram illustrating one embodiment of receiving unified DCI for DL PI and UL CI on unallocated DL symbols in the middle of scheduled DL/UL transmission across multiple TTIs.

FIG. 5 depicts an example scenario 500 of receiving unified DCI for DL PI and UL CI on unallocated DL symbols in the middle of scheduled DL/UL transmission across multiple TTIs (e.g., slots), according to embodiments of the second solution. Whenever a UE 205 is configured/indicated to monitor the unified DCI for DL PI and UL CI and the UE 205 is scheduled with multiple transmissions of DL and UL across multiple TTIs/slots, then the UE 205 monitors the PDCCH for the new DCI format, i.e., carrying unified DCI for DL PI and UL CI in the middle of these scheduled DL/UL transmissions. In various embodiments, the UE 205 monitors for the new unified DCI format during unallocated DL symbols in the multiple TTIs/slots, if any are available, as shown in FIG. 5.

In the scenario 500, the UE 205 receives a DCI 505 in slot N (e.g., in symbols 0 and 1 of slot N), where the DCI 505 schedules resources 510 for DL transmission (e.g., PDSCH) in slotN+1 and schedules resources 515 for UL transmission (e.g., PUSCH) in slot N+2. The DCI 505 additionally schedules resources 520 for DL transmission (e.g., PDSCH) in slot N+4 and schedules resources 525 for UL transmission (e.g., PUSCH) in slot N+5. The received DCI 505 is exemplary of first signaling information sent from the RAN node 210 that schedules communication resources. In the depicted embodiment, the first signaling information is a single, unified DCI containing both the UL resource grants and the DL resource grants. In other embodiments, the first signaling information may contain separate DCIs scheduling UL and DL, respectively.

The UE 205 is not allocated DL resources in slot N+3, therefore the UE 205 monitors for new unified DCI format 530 for preemption and cancellation indication. The unified DCI format 530 for preemption and cancellation indication received in slot N+3 indicates to the UE 205 both A) at least one grid 535 of time-frequency resources for DL preemption (i.e., the DL PI indicated region) and B) at least one additional grid 540 of time-frequency resources for UL cancellation (i.e., the UL PI indicated region).

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot, in other embodiments the scheduled/granted DL resources may be for only a portion of the slot. Similarly, while the depicted example shows the scheduled/granted UL resources spanning the entire slot, in other embodiments the scheduled/granted UL resources may be for only a portion of the slot.

While in the above description the DL resources 510, 520 (PDSCH) and UL resources 515, 525 (PUSCH) are each a dynamic grant scheduled using the DCI 505, in other embodiments one or both of the DL resources 510, 520 (PDSCH) and UL resources 515, 525 (PUSCH) may be a configured grant (i.e., semi-statically/semi-persistently scheduled resources). Here, the same principle applies that the new DCI format 530 indicates both a cancellation of already scheduled UL resources and a preemption of already scheduled DL resources.

In one example implementation of the second solution, whenever a UE 205 is configured/indicated to monitor the unified DCI 530 for DL PI and UL CI and can additionally be configured to monitor DCI format 2_1 and/or format 2_4, then the UE 205 is also configured with a new RNTI for scrambling the CRC of the new unified DCI, wherein the size of the new unified DCI is different from the size of DCI format 2_1 and format 2_4.

In another example implementation of the second solution, when a UE 205 is configured/indicated to monitor the unified DCI 530 for DL PI and UL CI, then the identity INT-RNTI (i.e., used for DL preemption indication) is used for scrambling the CRC of the new DCI 530 and the size of the new unified DCI 530 is the same as the size of DCI format 2_1 (i.e., used to signal DL preemption only).

In another example implementation of the second solution, when a UE 205 is configured/indicated to monitor the unified DCI 530 for DL PI and UL CI, then the identity CI-RNTI (i.e., used for UL cancellation indication) is used for scrambling the CRC of the new DCI 530 and the DCI size is the same as the size of DCI format 2_4 (i.e., used to signal UL cancellation only.

According to embodiments of a third solutions, a first time-frequency resources set is indicated for DL preemption and a second time-frequency resource set is indicated for UL CI.

Figure 6:
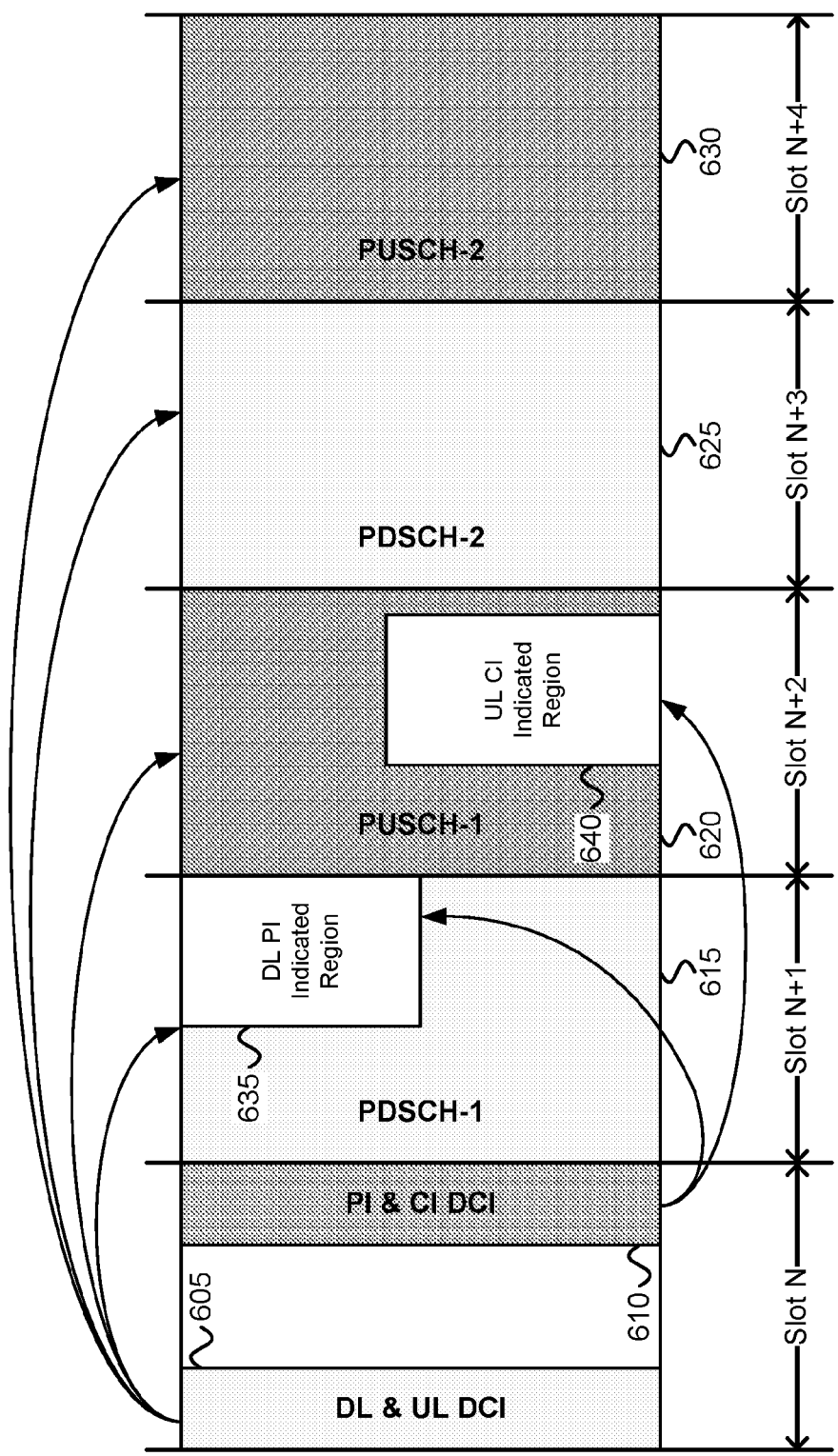
FIG. 6 depicts a diagram illustrating one embodiment of unified DCI for DL PI and UL CI applicable to only a single DL slot and a single UL slot from multiple scheduled slots.

FIG. 6 shows one example scenario 600 of unified DCI for DL PI and UL CI applicable to only single DL and UL TTI (slot), respectively, according to one implementation of the third solution. In the scenario 600, a UE, such as the UE 205, receives a DCI 605 in slot N (e.g., in symbols 0 and 1 of slot N), where the DCI 605 schedules resources 615 for DL transmission (e.g., PDSCH) in slot N+1 and schedules resources 620 for UL transmission (e.g., PUSCH) in slot N+2. The DCI 605 additionally schedules resources 625 for DL transmission (e.g., PDSCH) in slot N+4 and schedules resources 630 for UL transmission (e.g., PUSCH) in slot N+4. The received DCI 605 is exemplary of first signaling information sent from the RAN node 210 that schedules communication resources. In the depicted embodiment, the first signaling information is a single, unified DCI containing both the UL resource grant and the DL resource grant. In other embodiments, the first signaling information may contain separate DCIs scheduling UL and DL, respectively.

Additionally, the UE 205 also receives the new unified DCI format 610 for preemption and cancellation indication in slot N (e.g., in symbols 12 and 13 of slot N), which indicates to the UE 205 both A) at least one grid 635 of time-frequency resources for DL preemption (i.e., the DL PI indicated region) and B) at least one additional grid 640 of time-frequency resources for UL cancellation (i.e., the UL PI indicated region).

In the depicted scenario 600, a first time-frequency resources set in the DCI 610 indicated for DL preemption is used to determine the preemption region 635 only for a single TTI instance. Similarly, a second time-frequency resources set in the DCI 610 indicated for UL cancellation is used to determine the cancellation region 640 only for a single TTI instance. In the depicted embodiment, the DL and UL are scheduled across multiple TTIs (slots), but the PI and CI is signaled only for a one DL TTI and one UL TTI, respectively. Moreover, while the indicated preemption region 635 is in the slot N+1 and the indicated cancellation region 640 is in the slot N+2, in other embodiments the indicated preemption region 635 may be in the slot N+3 and the indicated cancellation region 640 may be in the slot N+4.

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 615, 625 (PDSCH) and UL resources 620, 630 (PUSCH) are each a dynamic grant scheduled using the DCI 605, in other embodiments one or both of the DL resources 615, 625 (PDSCH) and UL resources 620, 630 (PUSCH) may be a configured grant (i.e., semi-statically/semi-persistently scheduled resources). Here, the same principle applies that the new DCI format 610 indicates both a cancellation of already scheduled UL resources and a preemption of already scheduled DL resources.

Figure 7:
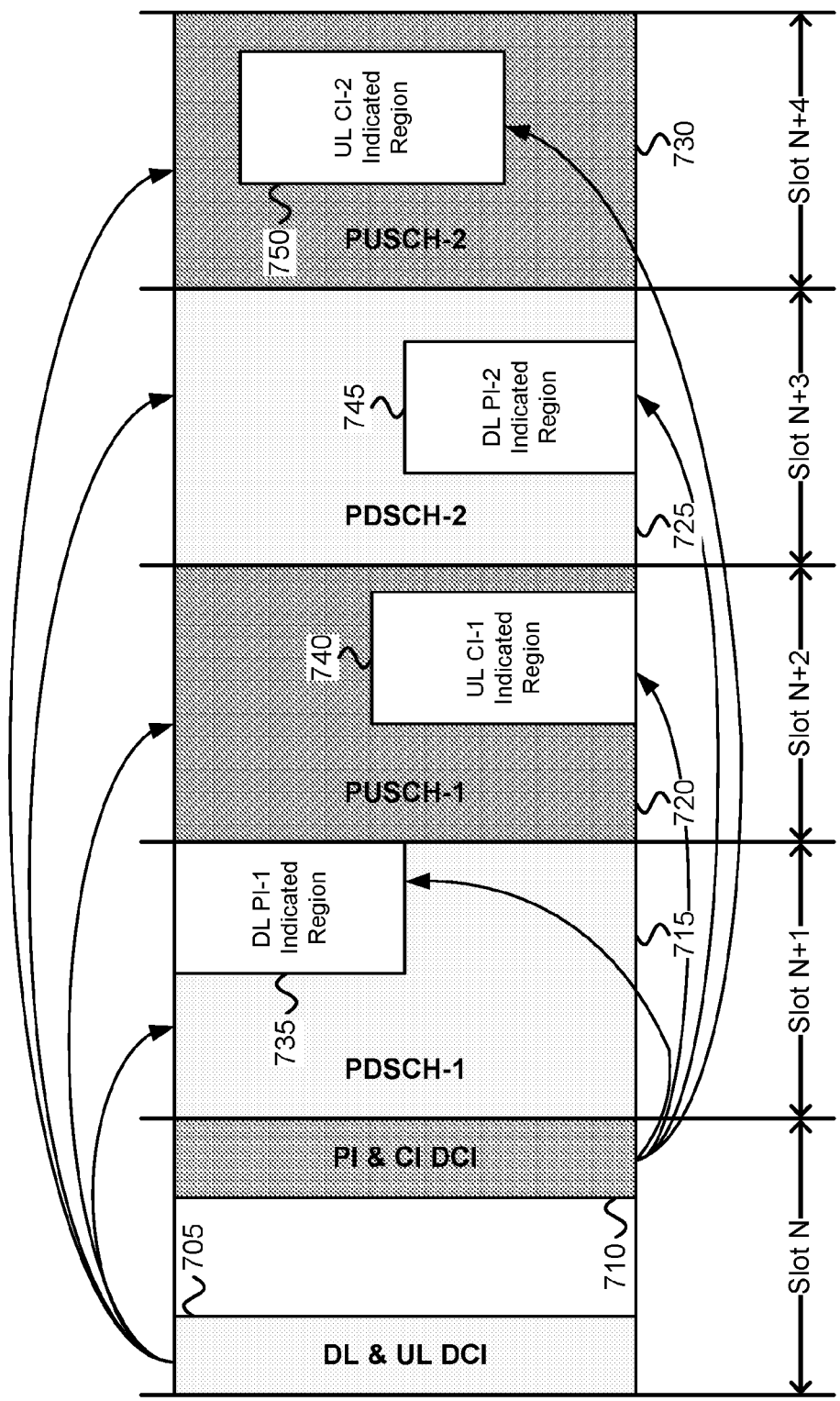
FIG. 7 depicts a diagram illustrating one embodiment of unified DCI for distinct DL Preemption Indications and UL Cancellation Indications applicable to multiple scheduled DL and UL slots.

FIG. 7 shows an example 700 of unified DCI for DL PI and UL CI applicable to multiple single DL and UL TTIs (slots), respectively (separate time-frequency region indication for each TTI for each DL and UL), according to an alternate implementation of the third solution. In the scenario 700, a UE, such as the UE 205, receives a DCI 705 in slot N (e.g., in symbols 0 and 1 of slot N), where the DCI 705 schedules resources 715 for DL transmission (e.g., PDSCH) in slot N+1 and schedules resources 720 for UL transmission (e.g., PUSCH) in slot N+2. The DCI 705 additionally schedules resources 725 for DL transmission (e.g., PDSCH) in slot N+4 and schedules resources 730 for UL transmission (e.g., PUSCH) in slot N+4. The received DCI 705 is exemplary of first signaling information sent from the RAN node 210 that schedules communication resources. In the depicted embodiment, the first signaling information is a single, unified DCI containing both the UL resource grant and the DL resource grant. In other embodiments, the first signaling information may contain separate DCIs scheduling UL and DL, respectively.

Additionally, the UE 205 also receives the new unified DCI format 710 for preemption and cancellation indication in slot N (e.g., in symbols 12 and 13 of slot N), which indicates to the UE 205 both A) at least one grid of first time-frequency resources 735 for DL preemption (i.e., the DL PI-1 indicated region) and second time-frequency resources 745 for DL preemption (i.e., the DL PI-2 indicated region) and B) at least one additional grid of first time-frequency resources 740 for UL cancellation (i.e., the UL PI-1 indicated region) and second time-frequency resources 750 for UL cancellation (i.e., the UL PI-2 indicated region).

In the depicted scenario 700, a first time-frequency resources set in the DCI 710 consisting of multiple time-frequency resources indicated for DL preemption is used to determine the preemption regions 735, 745 for multiple TTI instances. Similarly, a second time-frequency resources set in the DCI 710 consisting of multiple time-frequency resources indicated for UL cancellation is used to determine the cancellation regions 740, 750. In this depicted embodiment, the DL and UL are scheduled across multiple TTIs (slots), and the PI and CI is signaled separately for multiple DL TTIs and on UL TTIs, respectively.

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 715, 725 (PDSCH) and UL resources 720, 730 (PUSCH) are each a dynamic grant scheduled using the DCI 705, in other embodiments one or both of the DL resources 715, 725 (PDSCH) and UL resources 720, 730 (PUSCH) may be a configured grant (i.e., semi-statically/semi-persistently scheduled resources). Here, the same principle applies that the new DCI format 710 indicates both a cancellation of already scheduled UL resources and a preemption of already scheduled DL resources.

Figure 8:
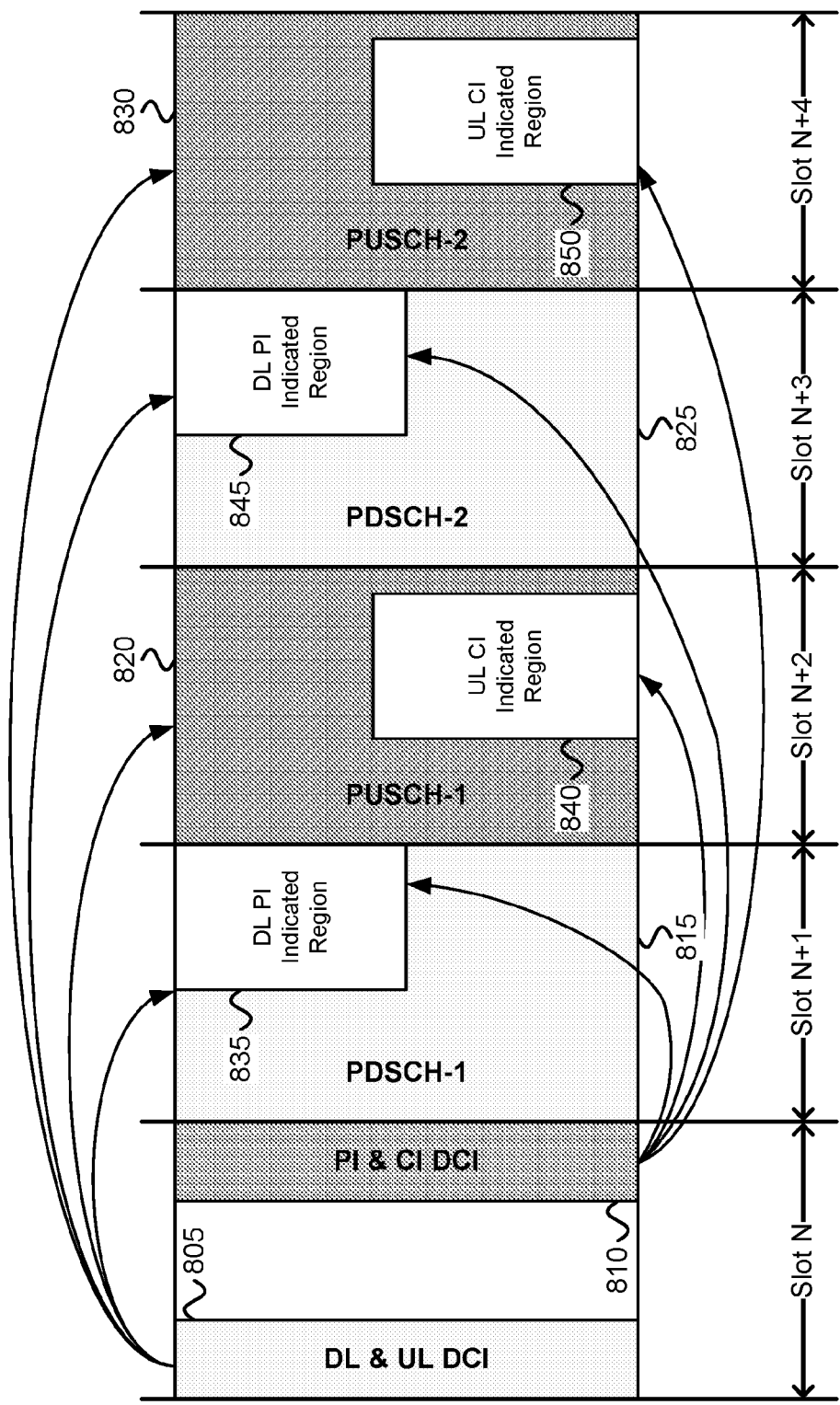
FIG. 8 depicts a diagram illustrating one embodiment of unified DCI for common DL Preemption Indications and UL Cancellation Indications applicable to multiple scheduled DL and UL slots.

FIG. 8 shows an example 800 of unified DCI for DL PI and UL CI applicable to multiple single DL and UL TTIs (slots), respectively (same time-frequency region indication repeated for each TTI for each DL and UL), according to another implementation of the third solution. In the scenario 800, a UE, such as the UE 205, receives a DCI 805 in slot N (e.g., in symbols 0 and 1 of slot N), where the DCI 805 schedules resources 815 for DL transmission (e.g., PDSCH) in slot N+1 and schedules resources 820 for UL transmission (e.g., PUSCH) in slot N+2. The DCI 805 additionally schedules resources 825 for DL transmission (e.g., PDSCH) in slot N+4 and schedules resources 830 for UL transmission (e.g., PUSCH) in slot N+4. The received DCI 805 is exemplary of first signaling information sent from the RAN node 210 that schedules communication resources. In the depicted embodiment, the first signaling information is a single, unified DCI containing both the UL resource grant and the DL resource grant. In other embodiments, the first signaling information may contain separate DCIs scheduling UL and DL, respectively.

Additionally, the UE 205 also receives the new unified DCI format 810 for preemption and cancellation indication in slot N (e.g., in symbols 12 and 13 of slot N), which indicates to the UE 205 both A) at least one grid of first time-frequency resources 835 for DL preemption (i.e., the DL PI-1 indicated region) and second time-frequency resources 845 for DL preemption (i.e., the DL PI-2 indicated region) and B) at least one additional grid of first time-frequency resources 840 for UL cancellation (i.e., the UL PI-1 indicated region) and second time-frequency resources 850 for UL cancellation (i.e., the UL PI-2 indicated region).

In the depicted scenario 800, a first time-frequency resources set in the DCI 810 consisting of one time-frequency resource indicated for DL preemption is used to determine the preemption region for one TTI instance (e.g., region 835) and also the following instances with same time-frequency region as for first TTI instance (e.g., region 845). Similarly, a second time-frequency resources set in the DCI 810 consisting of one time-frequency resource indicated for UL cancellation is used to determine the preemption region for one TTI instance (e.g., region 840) and also the following instances with same time-frequency region as for first TTI instance (e.g., region 850).

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 815, 825 (PDSCH) and UL resources 820, 830 (PUSCH) are each a dynamic grant scheduled using the DCI 805, in other embodiments one or both of the DL resources 815, 825 (PDSCH) and UL resources 820, 830 (PUSCH) may be a configured grant (i.e., semi-statically/semi-persistently scheduled resources). Here, the same principle applies that the new DCI format 810 indicates both a cancellation of already scheduled UL resources and a preemption of already scheduled DL resources.

Figure 9:
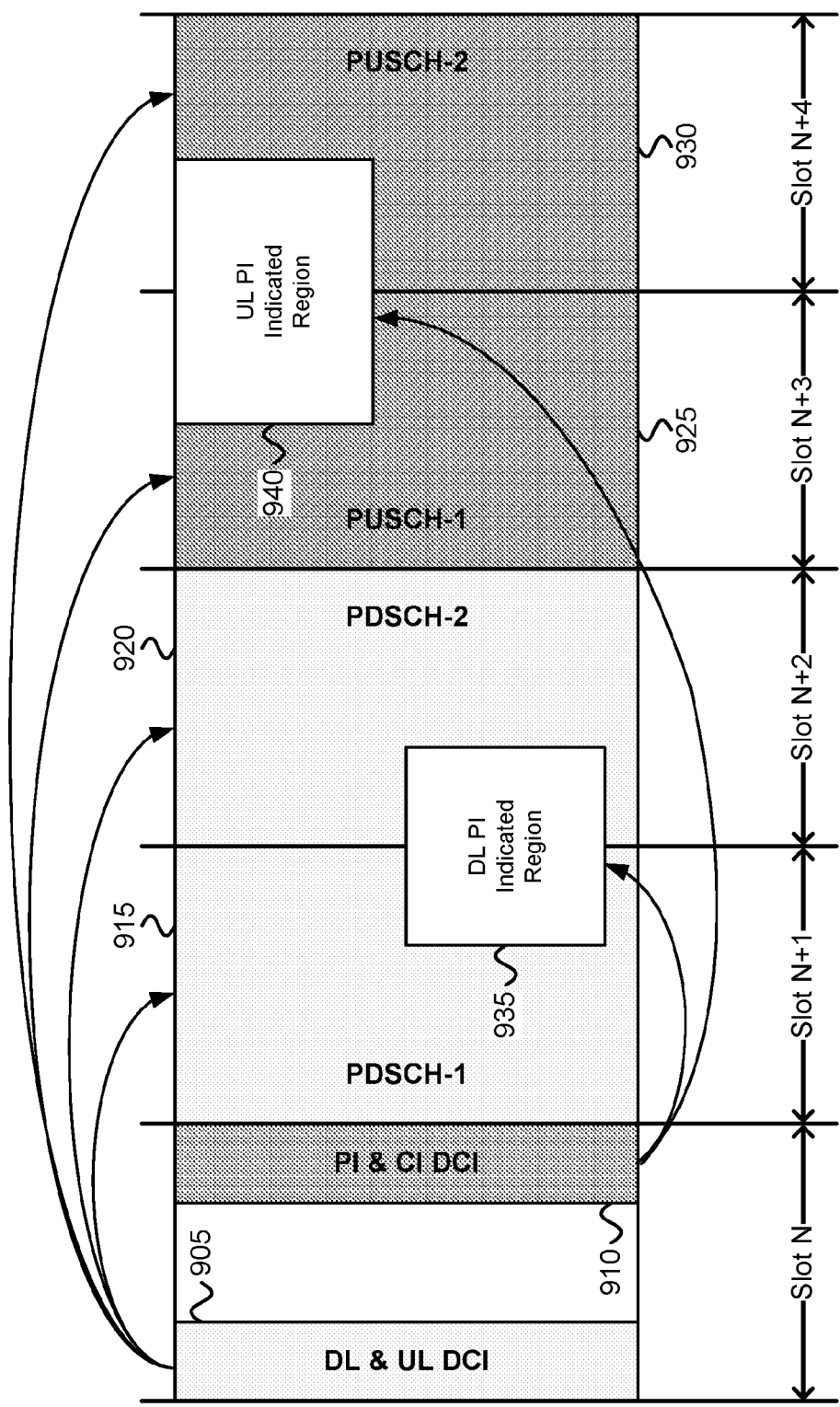
FIG. 9 depicts a diagram illustrating one embodiment of unified DCI for DL PI and UL CI spanning to multiple DL and UL slots.

FIG. 9 shows an example 900 of unified DCI for DL PI and UL CI applicable to multiple single DL and UL TTIs (slots), respectively (single time-frequency region indication spanning more than one TTI for each DL and UL), according to further implementation of the third solution.

In the scenario 900, a UE, such as the UE 205, receives a DCI 905 in slot N (e.g., in symbols 0 and 1 of slot N), where the DCI 905 schedules resources 915 for DL transmission (e.g., PDSCH) in slot N+1 and schedules resources 920 for DL transmission (e.g., PSSCH) in slot N+2. The DCI 905 additionally schedules resources 925 for UL transmission (e.g., PUSCH) in slot N+4 and schedules resources 930 for UL transmission (e.g., PUSCH) in slot N+4. The received DCI 905 is exemplary of first signaling information sent from the RAN node 210 that schedules communication resources. In the depicted embodiment, the first signaling information is a single, unified DCI containing both the UL resource grant and the DL resource grant. In other embodiments, the first signaling information may contain separate DCIs scheduling UL and DL, respectively.

Additionally, the UE 205 also receives the new unified DCI format 910 for preemption and cancellation indication in slot N (e.g., in symbols 12 and 13 of slot N), which indicates to the UE 205 both A) at least one grid of first time-frequency resources 935 for DL preemption (i.e., the DL PI-1 indicated region) and B) at least one additional grid of first time-frequency resources 940 for UL cancellation (i.e., the UL PI-1 indicated region).

In the depicted scenario 900, a first time-frequency resources set in the DCI 910 consisting of one time-frequency resource indicated for DL preemption can span more than one TTI and can be used to determine the preemption region 935 across multiple TTIs (DL). Similarly, a second time-frequency resources set in the DCI 910 consisting of one time-frequency resource indicated for UL cancellation can span more than one TTI and can be used to determine the preemption region 940 across multiple TTIs (UL).

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 915, 925 (PDSCH) and UL resources 920, 930 (PUSCH) are each a dynamic grant scheduled using the DCI 905, in other embodiments one or both of the DL resources 915, 925 (PDSCH) and UL resources 920, 930 (PUSCH) may be a configured grant (i.e., semi-statically/semi-persistently scheduled resources). Here, the same principle applies that the new DCI format 910 indicates both a cancellation of already scheduled UL resources and a preemption of already scheduled DL resources.

According to embodiments of a fourth solution, only one time-frequency resource set is indicated, wherein the single time-frequency resource can indicate the region for both DL PI and/or UL CI. In one example implementation of this solution, the time-frequency resource indicates regions across two TTIs, where one TTI is scheduled with PDSCH and other TTI is scheduled with PUSCH and consequently, the region in the PDSCH TTI can be determined for DL PI and the region in the PUSCH TTI can be determined for UL CI.

In one implementation of the fourth solution, for potential DL preemption and UL cancellation, a UE 205 is configured with a single DCI field per serving cell (if a SUL carrier is not configured for a serving cell), where the single DCI field addresses a reference time-frequency region including at least one semi-statically configured DL symbol(s) and at least one semi-statically configured UL symbol(s). The UE 205 is configured with two DCI fields per serving cell (if a SUL carrier is configured for a serving cell), where one of the two DCI fields addresses a reference time-frequency region including at least one semi-statically configured DL symbol(s) and at least one semi-statically configured UL symbol(s). For a plurality of indicated resources from the reference time-frequency region, the UE 205 determines to apply UL cancellation (e.g., not transmitting scheduled PUSCH and SRS) or DL preemption (i.e., assuming no transmission to the UE 205) based on PDSCH/PUSCH scheduling information, semi-static UL/DL configuration, and PUSCH processing time.

In one example, the UE 205 applies UL cancellation for a PUSCH/SRS starting at least after $T_{proc,2}+d$ from the end of a PDCCH reception where the UE 205 detects a DCI format 2_x. $T_{proc,2}$ corresponds to the PUSCH processing capability 2 assuming $d_{2,1}=0$ with μ being the smallest SCS configuration between the SCS configurations of the PDCCH and of a PUSCH transmission or of an SRS transmission on the serving cell. The UE 205 does not expect to cancel the PUSCH transmission or the SRS transmission before a corresponding symbol that is $T_{proc,2}$ after a last symbol of a CORESET where the UE 205 detects the DCI format 2_x.

In another implementation of the fourth solution, a UE 205 flexibly determines a reference time region in symbols of a serving cell, where a detected Preemption and Cancellation Indication ("PCI") is applicable, based on a configuration parameter in a PCI configuration and/or a dynamic indication in a DCI field of a DCI format 2_x. For example, in one configuration, all symbols of the reference time region are earlier than the first symbol of a CORESET where the DCI format 2_x is detected. In another configuration, [X] number of symbols of the reference time region are earlier than the first symbol of the CORESET where the DCI format 2_x is detected, and [N-X] symbols of the reference time region are on or after the first symbol of the CORESET, where N is a number of symbols in the reference time region and can be indicated in the PCI configuration. In other configurations, the reference time region comprises at least two non-contiguous time windows. In one example, [Y] number of symbols of the reference time region are earlier than the first symbol of the CORESET where the DCI format 2_x is detected, and [N-Y] symbols of the reference time region are after the last symbol of the CORESET. The DCI field of the DCI format 2_x indicates a selected configuration.

In one example, if a UE 205 is provided PreemptionCancellation, the UE 205 is configured with a preemption and cancellation indication (PCI)-RNTI provided by pci-RNTI for monitoring PDCCH conveying DCI format 2_x. The UE 205 is additionally configured with the following:

- A set of serving cells by pci-ConfigurationPerServingCell that includes a set of serving cell indexes provided by corresponding servingCellId and a corresponding set of locations for fields in DCI format 2_x by positionInDCI
- A number of fields in DCI format 2_x, by positionInDCI-forSUL, for each serving cell for a SUL carrier, if the serving cell is configured with the SUL carrier
- An information payload size for DCI format 2_x by dci-PayloadSizeForPCI
- An indication for time-frequency resources by timeFrequencyRegion
- For a serving cell having an associated field in DCI format 2_x, for the field denote by
    - $N_{PCI}$ a number of bits provided by pci-PayloadSize;
    - $B_{PCI}$ a number of PRBs provided byfrequencyRegionforPCI in timeFrequencyRegion;
    - $T_{PCI}$ a number of symbols, excluding symbols for reception of SS/PBCH blocks, provided by timeDurationforPCI in timeFrequencyRegion; and
    - $G_{PCI}$ a number of partitions for the $T_{PCI}$ symbols provided by timeGranularityforPCI in timeFrequencyRegion.

Here, $G_{PCI}$ sets of bits from the $N_{PCI}$ bits have a one-to-one mapping with $G_{PCI}$ groups of symbols where each of the first $G_{PCI}-T_{PCI}+\lfloor T_{PCI}/G_{PCI}\rfloor$ $G_{PCI}$ groups includes $\lfloor T_{PCI}/G_{PCI}\rfloor$ symbols and each of the remaining $T_{PCI}-\lfloor T_{PCI}/G_{PCI}\rfloor\cdot G_{PCI}$ groups includes $\lceil T_{PCI}/G_{PCI}\rceil$ symbols. A UE 205 determines a symbol duration with respect to a SCS configuration of an active DL BWP where the UE 205 monitors PDCCH for DCI format 2_x detection.

For a group of symbols, $N_{BI}=N_{PCI}/G_{PCI}$ bits from each set of bits have a one-to-one mapping with $N_{BI}$ groups of PRBs where each of the first $N_{BI}-B_{PCI}+\lfloor B_{PCI}/N_{BI}\rfloor\cdot N_{BI}$ groups includes $\lfloor B_{PCI}/N_{BI}\rfloor$ PRBs and each of the remaining $B_{PCI}-\lfloor B_{PCI}/N_{BI}\rfloor\cdot N_{BI}$ groups includes $\lceil B_{PCI}/N_{BI}\rceil$ PRBs. A UE 205 determines a first PRB index as $N_{RFR}^{start}=O_{carrier}+RB_{start}$ and a number of contiguous RBs as $N_{RFR}^{size}=L_{RB}$ from frequencyRegionforPCI that indicates an offset $RB_{start}$ and a length $L_{RB}$ as RIV according to TS 38.214, and from offsetToCarrier in FrequencyInfoUL-SIB that indicates $O_{carrier}$ for a SCS configuration of an active DL BWP where the UE 205 monitors PDCCH for DCI format 2_x detection.

FIG. 10 depicts one example of a PreemptionCancellation information element 1000 used to configure the UE 205 to monitor PDCCH for the PCI-RNTI. The following parameters used in the PreemptionCancellation information element 1000 are defined:

- pci-ConfigurationPerServingCell: indicates (per serving cell) the position of the pci-PayloadSize bit PCI values inside the DCI payload
- pci-RNTI: the RNTI used for indication of cancellation in UL and preemption in DL
- dci-PayloadSizeForPCI: the total length of the DCI payload scrambled with PCI-RNTI.
- pci-PayloadSize: configures the field size for each UL cancelation and DL preemption indicator of this serving cell (identified by parameter servingCellId)
- frequencyRegionForPCI: Configures the reference frequency region where a detected PCI is applicable. It is defined in the same way as parameter locationAndBandwidth.
- positionInDCL: Starting position (in number of bit) of the pci-PayloadSize bit PCI value applicable for SUL of this serving cell (identified by parameter servingCellId) within the DCI payload
- positionInDCI-ForSUL: Starting position (in number of bit) of the parameter pci-PayloadSize bit PCI value applicable for this serving cell (identified by parameter servingCellId) within the DCI payload
- timeDurationForPCI: Configures the duration of the reference time region in symbols where a detected PCI is applicable of this serving cell (identified by parameter servingCellId).
- timeWindowForPCI: Configures a list of time window positions relative to a CORESET where the DCI format 2_x is detected
- timeFrequencyRegion: Configures the reference time and frequency region where a detected PCI is applicable of this serving cell (identified by parameter servingCellId)
- timeGranularityForPCI Configures the number of partitions within the time region of this serving cell (identified by parameter servingCellId)

According to embodiments of a fifth solution, when multiple or single UL transmissions (i.e., TBs) are scheduled across multiple TTIs in a contiguous manner and UE 205 is indicated with a time-frequency region for cancellation, then the UL transmission is either completely or partially cancelled only for TTIs that have at least partial overlap with the indicated time-frequency region for cancellation.

Figure 11:
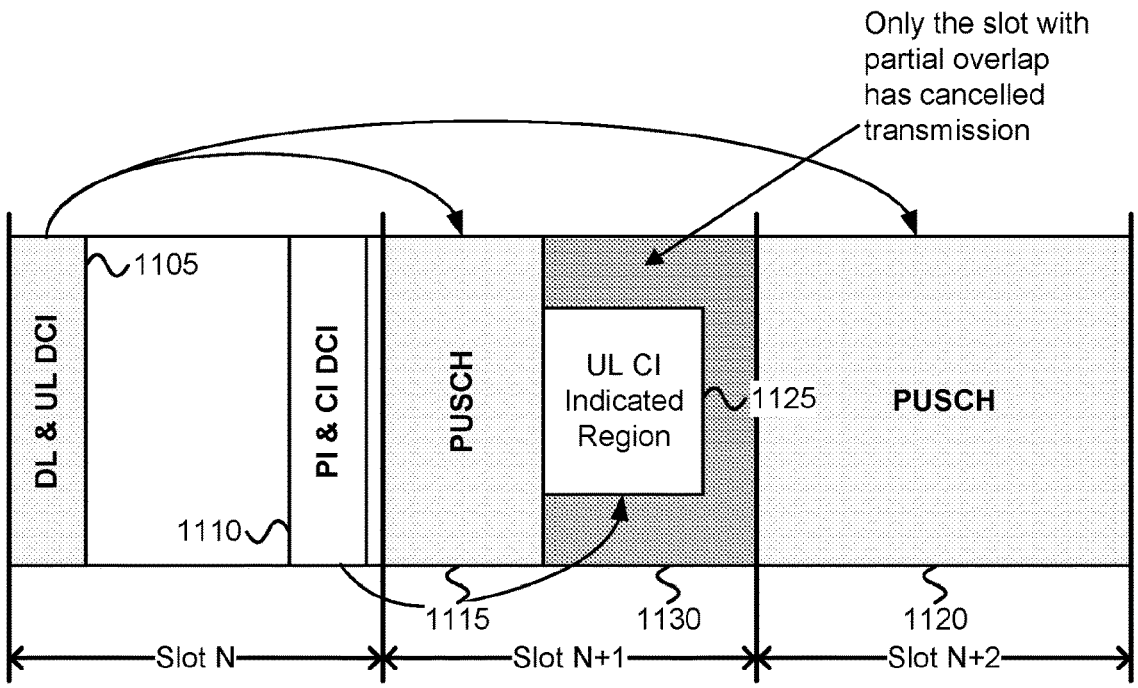
FIG. 11 depicts a diagram illustrating one embodiment of cancellation mechanism of only UL transmission on TTIs that have at least partial overlap with indicated time-frequency region.

FIG. 11 shows an example of cancellation mechanism of only UL transmission on TTIs (e.g., slots) that have at least partial overlap with indicated time-frequency region, according to one implementation of the fifth solution. In the scenario 1100, the UE 205 receives a DCI 1105 in slot N (e.g., in symbols 0 and 1 of slot N), where the DCI 1105 schedules resources 1115 for UL transmission (e.g., PUSCH) in slot N+1 and schedules resources 1120 for UL transmission (e.g., PUSCH) in slot N+2. The received DCI is exemplary of first signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

Additionally, the UE 205 also receives the new unified DCI format 1110 for preemption and cancellation indication in slot N (e.g., in symbols 12 and 13 of slot N), which indicates to the UE 205 at least one grid 1125 of time-frequency resources for UL cancellation (i.e., the UL PI indicated region). In the depicted example, when multiple or single UL transmissions (TBs) are scheduled across multiple TTIs in a contiguous manner and UE 205 is indicated with a time-frequency region for cancellation, then the UL transmissions are partially cancelled only for TTIs that have at least partial overlap with the indicated time-frequency region for cancellation. Accordingly, the remaining UL resources 1130 in slot N+1 are cancelled.

While in the above description the UL resources 1115 and 1120 (PUSCH) are each a dynamic grant scheduled using the DCI 1105, in other embodiments one or both of the UL resources 1115 and 1120 may be a configured grant (i.e., semi-statically/semi-persistently scheduled resources). Moreover, the new unified DCI format 1110 may be used to indicate both a cancellation of already scheduled UL resources and a preemption of already scheduled DL resources.

Figure 12:
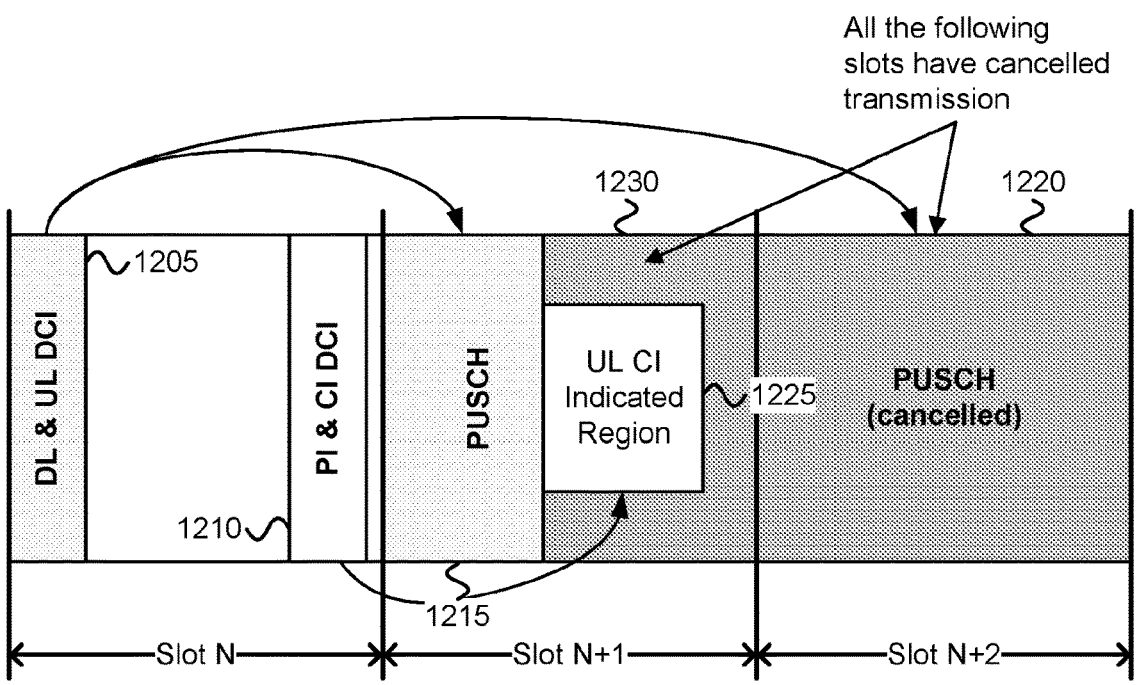
FIG. 12 depicts a diagram illustrating one embodiment of cancellation mechanism of UL transmission on all TTIs after and including the TTI that has at least partial overlap with indicated time-frequency region.

FIG. 12 shows an example of cancellation mechanism of UL transmission on all TTIs (e.g., slots) after and including the TTI that has at least partial overlap with indicated time-frequency region, according to an alternate embodiment of the fifth solution. In the scenario 1200, the UE 205 receives a DCI 1205 in slot N (e.g., in symbols 0 and 1 of slot N), where the DCI 1205 schedules resources 1215 for UL transmission (e.g., PUSCH) in slot N+1 and schedules resources 1220 for UL transmission (e.g., PUSCH) in slot N+2. The received DCI is exemplary of first signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

Additionally, the UE 205 also receives the new unified DCI format 1210 for preemption and cancellation indication in slot N (e.g., in symbols 12 and 13 of slot N), which indicates to the UE 205 at least one grid 1225 of time-frequency resources for UL cancellation (i.e., the UL PI indicated region). In the depicted example, when multiple or single UL transmissions (TBs) are scheduled across multiple TTIs in a contiguous manner and UE 205 is indicated with a time-frequency region for cancellation, then all the UL transmissions in all the TTIs following and including the TTI are cancelled that have at least partial overlap with the indicated time-frequency region for cancellation. Accordingly, the remaining UL resources 1230 in slot N+1 are cancelled.

While in the above description the UL resources 1215 and 1220 (PUSCH) are each a dynamic grant scheduled using the DCI 1205, in other embodiments one or both of the UL resources 1215 and 1220 may be a configured grant (i.e., semi-statically/semi-persistently scheduled resources). Moreover, the new unified DCI format 1210 may be used to indicate both a cancellation of already scheduled UL resources and a preemption of already scheduled DL resources.

Regarding determining a grid of time-frequency resources for UL CI and/or DL PI, for a serving cell, the UE 205 may determine the first symbol of the time region for UL CI to be a first symbol that is after a first offset from the end of the PDCCH reception where the UE 205 detects the unified DCI format for UL CI and DL PI. In another example, the UE 205 determines the first symbol of the time region for UL CI to be a second symbol that is after a second offset from the end of the PDCCH reception where the UE 205 detects DCI format 2_4. In an example, the first offset is different than the second offset. In an example, the first offset is determined based on the second offset (e.g., the first offset is the second offset plus additional symbols). In an example, the first offset and/or the second offset is different than the offset determined for UL CI operation in 3GPP Release 16.

According to embodiments of the sixth solution, the new unified DCI format for UL CI and DL PI may apply only to certain spatial filters, beams, and/or UE panels.

In one embodiment of the sixth solution, one or more TCI state(s) containing information on UEs transmit spatial filter/beam/panel can be associated with a UL CI in DCI format 2_4 informing group of UEs that the UL CI is applicable only for subset of UEs with the indicated TCI states. In one implementation of the sixth solution, UEs receiving the UL CI based on the configured RNTI further checks the TCI state field associated with the UL CI and does not transmit UL using the indicated TCI state. In another implementation of the sixth solution, the UEs receiving the UL CI based on the configured RNTI further check the TCI state field associated with the UL CI and does not transmit UL using the indicated TCI state while reduce the uplink transmission power to transmit UL using a TCI state that is not indicated in the UL CI.

In another embodiment of the sixth solution, one or more TCI state(s) containing information on the UEs receive spatial filter/beam/panel can be associated with a DL PI in DCI format 2_1 informing group of UEs that the DL PI is applicable only for subset of UEs with the indicated TCI state(s). In one implementation of the sixth solution of the sixth solution, UEs receiving DL PI based on the configured RNTI further check the TCI state field associated with the DL PI to clear the soft buffer.

In another embodiment of the sixth solution, one or more TCI state(s) containing spatial filter/beam/panel can be associated separately with a DL PI and UL CI using separate fields or a common field indicating the TCI state for both DL PI and UL CI. The UEs receiving the unified DCI format indicating DL PI and UL CI, based on the configured RNTI further checks TCI state field and perform one or more action according to the sixth solution.

Figure 13:
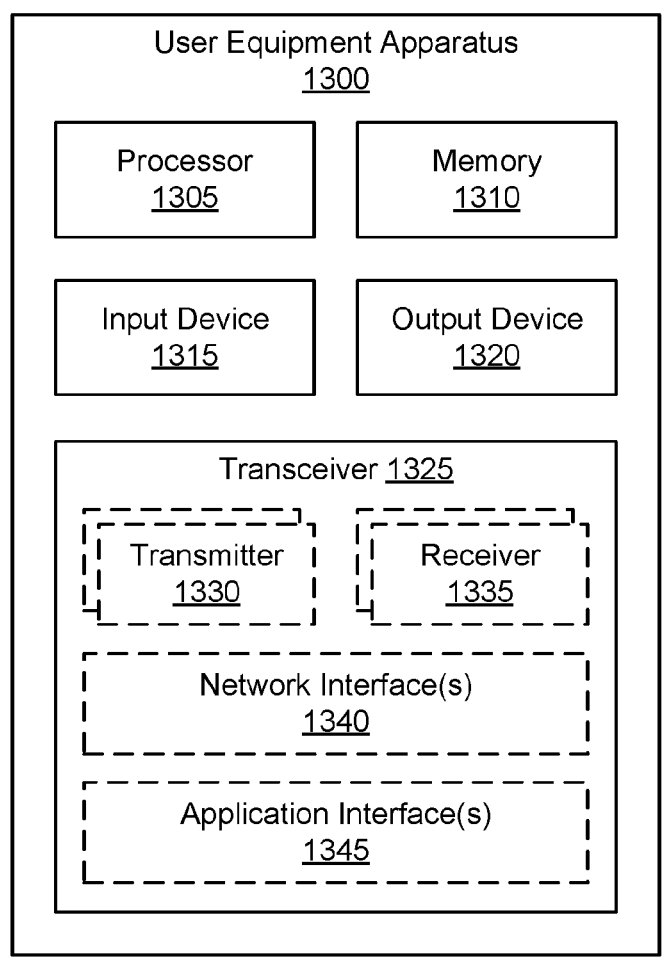
FIG. 13 is a block diagram illustrating one embodiment of a user equipment apparatus that may be used for unified signaling for DL PI and UL CI.

FIG. 13 depicts a user equipment apparatus 1300 that may be used for unified signaling for DL PI and UL CI, according to embodiments of the disclosure. In various embodiments, the user equipment apparatus 1300 is used to implement one or more of the solutions described above. The user equipment apparatus 1300 may be one embodiment of the remote unit 105 and/or the UE 205, described above. Furthermore, the user equipment apparatus 1300 may include a processor 1305, a memory 1310, an input device 1315, an output device 1320, and a transceiver 1325.

In some embodiments, the input device 1315 and the output device 1320 are combined into a single device, such as a touchscreen. In certain embodiments, the user equipment apparatus 1300 may not include any input device 1315 and/or output device 1320. In various embodiments, the user equipment apparatus 1300 may include one or more of: the processor 1305, the memory 1310, and the transceiver 1325, and may not include the input device 1315 and/or the output device 1320.

As depicted, the transceiver 1325 includes at least one transmitter 1330 and at least one receiver 1335. In some embodiments, the transceiver 1325 communicates with one or more cells (or wireless coverage areas) supported by one or more base units 121. In various embodiments, the transceiver 1325 is operable on unlicensed spectrum. Moreover, the transceiver 1325 may include multiple UE panels supporting one or more beams. Additionally, the transceiver 1325 may support at least one network interface 1340 and/or application interface 1345. The application interface(s) 1345 may support one or more APIs. The network interface(s) 1340 may support 3GPP reference points, such as Uu, N1, PC5, etc. Other network interfaces 1340 may be supported, as understood by one of ordinary skill in the art.

The processor 1305, in one embodiment, may include any known controller capable of executing computer-readable instructions and/or capable of performing logical operations. For example, the processor 1305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1305 executes instructions stored in the memory 1310 to perform the methods and routines described herein. The processor 1305 is communicatively coupled to the memory 1310, the input device 1315, the output device 1320, and the transceiver 1325.

In various embodiments, the processor 1305 controls the user equipment apparatus 1300 to implement the above described UE behaviors. In certain embodiments, the processor 1305 may include an application processor (also known as "main processor") which manages application-domain and operating system ("OS") functions and a baseband processor (also known as "baseband radio processor") which manages radio functions.

In various embodiments, the processor 1305 controls the transceiver 1325 to receive first signaling information from a RAN device that schedules first communication resources. The transceiver 1325 further receives second signaling information (i.e., unified GC-DCI) after receiving the first signaling information. Here, the processor 1305 determines unavailability of at least one set of uplink resources and unavailability of at least one set of downlink resources from the second signaling information on the scheduled first communication resources.

In some embodiments, receiving the first signaling information includes receiving first scheduling information (e.g., CG or DCI) that schedules first uplink resources and receiving second scheduling information (e.g., CG or DCI) that schedules first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH.

In some embodiments, the processor 1305 monitors for the group-common unified DCI in response to a ratio of uplink subcarrier spacing to downlink subcarrier spacing being below a threshold value. In some embodiments, the processor 1305 monitors for the group-common unified DCI in response to a subcarrier spacing associated with the PDCCH being above a threshold value (e.g., monitors for unified DCI for UL CI and DL PI when high SCS is utilized).

In some embodiments, the processor 1305 suspends monitoring of certain signaling information in response to determining to monitor for the group-common unified DCI. Here, the certain signaling information may be signaling information transmitted by DCI format to indicate uplink cancellation (e.g., DCI format 2_4) and/or signaling information transmitted by DCI format to indicate downlink preemption (e.g., DCI format 2_1).

In some embodiments, the processor 1305 further controls the transceiver 1325 to communicate with the RAN using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the transceiver 1325 further receives a RRC configuration. In such embodiments, a time region for which the at least one set of uplink resources is unavailable may be determined from the RRC configuration. In some embodiments, the transceiver 1325 further receives a RRC configuration. In such embodiments, a time region for which the at least one set of downlink resources is unavailable may be determined from the RRC configuration.

In some embodiments, a time region for which the at least one set of uplink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

The memory 1310, in one embodiment, is a computer readable storage medium. In some embodiments, the memory 1310 includes volatile computer storage media. For example, the memory 1310 may include a RAM, including dynamic RAM ("DRAM"), synchronous dynamic RAM ("SDRAM"), and/or static RAM ("SRAM"). In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data related to unified signaling for DL PI and UL CI. For example, the memory 1310 may store various parameters, panel/beam configurations, resource assignments, policies, and the like as described above. In certain embodiments, the memory 1310 also stores program code and related data, such as an operating system or other controller algorithms operating on the apparatus 1300.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, is designed to output visual, audible, and/or haptic signals. In some embodiments, the output device 1320 includes an electronically controllable display or display device capable of outputting visual data to a user. For example, the output device 1320 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1320 may include a wearable display separate from, but communicatively coupled to, the rest of the user equipment apparatus 1300, such as a smart watch, smart glasses, a heads-up display, or the like. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all or portions of the output device 1320 may be integrated with the input device 1315. For example, the input device 1315 and output device 1320 may form a touchscreen or similar touch-sensitive display. In other embodiments, the output device 1320 may be located near the input device 1315.

The transceiver 1325 communicates with one or more network functions of a mobile communication network via one or more access networks. The transceiver 1325 operates under the control of the processor 1305 to transmit messages, data, and other signals and also to receive messages, data, and other signals. For example, the processor 1305 may selectively activate the transceiver 1325 (or portions thereof) at particular times in order to send and receive messages.

The transceiver 1325 includes at least transmitter 1330 and at least one receiver 1335. One or more transmitters 1330 may be used to provide UL communication signals to a base unit 121, such as the UL transmissions described herein. Similarly, one or more receivers 1335 may be used to receive DL communication signals from the base unit 121, as described herein. Although only one transmitter 1330 and one receiver 1335 are illustrated, the user equipment apparatus 1300 may have any suitable number of transmitters 1330 and receivers 1335. Further, the transmitter(s) 1330 and the receiver(s) 1335 may be any suitable type of transmitters and receivers. In one embodiment, the transceiver 1325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1325, transmitters 1330, and receivers 1335 may be implemented as physically separate components that access a shared hardware resource and/or software resource, such as for example, the network interface 1340.

In various embodiments, one or more transmitters 1330 and/or one or more receivers 1335 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1330 and/or one or more receivers 1335 may be implemented and/or integrated into a multi-chip module. In some embodiments, other components such as the network interface 1340 or other hardware components/circuits may be integrated with any number of transmitters 1330 and/or receivers 1335 into a single chip. In such embodiment, the transmitters 1330 and receivers 1335 may be logically configured as a transceiver 1325 that uses one more common control signals or as modular transmitters 1330 and receivers 1335 implemented in the same hardware chip or in a multi-chip module.

Figure 14:
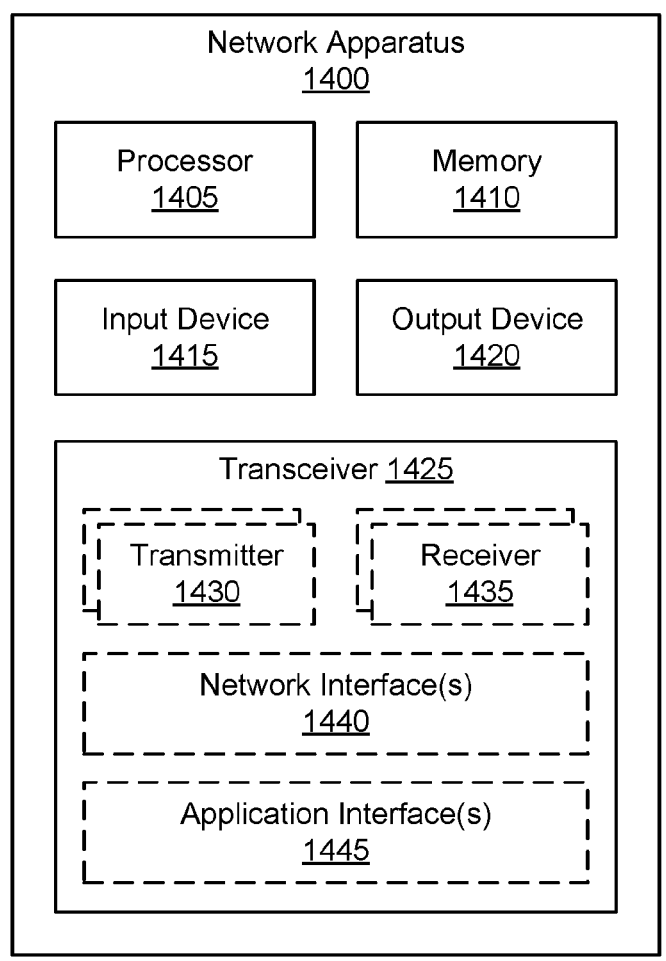
FIG. 14 is a block diagram illustrating one embodiment of a network equipment apparatus that may be used for unified signaling for DL PI and UL CI.

FIG. 14 depicts a network apparatus 1400 that may be used for unified signaling for DL PI and UL CI, according to embodiments of the disclosure. In one embodiment, network apparatus 1400 may be one implementation of a RAN node, such as the base unit 121 and/or the RAN node 210, as described above. Furthermore, the base network apparatus 1400 may include a processor 1405, a memory 1410, an input device 1415, an output device 1420, and a transceiver 1425.

In some embodiments, the input device 1415 and the output device 1420 are combined into a single device, such as a touchscreen. In certain embodiments, the network apparatus 1400 may not include any input device 1415 and/or output device 1420. In various embodiments, the network apparatus 1400 may include one or more of: the processor 1405, the memory 1410, and the transceiver 1425, and may not include the input device 1415 and/or the output device 1420.

As depicted, the transceiver 1425 includes at least one transmitter 1430 and at least one receiver 1435. Here, the transceiver 1425 communicates with one or more remote units 145. Additionally, the transceiver 1425 may support at least one network interface 1440 and/or application interface 1445. The application interface(s) 1445 may support one or more APIs. The network interface(s) 1440 may support 3GPP reference points, such as Uu, N1, N2 and N3. Other network interfaces 1440 may be supported, as understood by one of ordinary skill in the art.

The processor 1405, in one embodiment, may include any known controller capable of executing computer-readable instructions and/or capable of performing logical operations. For example, the processor 1405 may be a microcontroller, a microprocessor, a CPU, a GPU, an auxiliary processing unit, a FPGA, or similar programmable controller. In some embodiments, the processor 1405 executes instructions stored in the memory 1410 to perform the methods and routines described herein. The processor 1405 is communicatively coupled to the memory 1410, the input device 1415, the output device 1420, and the transceiver 1425.

In various embodiments, the network apparatus 1400 is a RAN node (e.g., gNB) that communicates with one or more UEs, as described herein. In such embodiments, the processor 1405 controls the network apparatus 1400 to perform the above described RAN behaviors. When operating as a RAN node, the processor 1405 may include an application processor (also known as "main processor") which manages application-domain and operating system ("OS") functions and a baseband processor (also known as "baseband radio processor") which manages radio functions.

In various embodiments, the processor 1405 controls the transceiver 1425 to transmit first signaling information that schedule first communication resources to a UE. At some time after transmitting the first signaling information, the processor 1405 determines the unavailability of at least one set of uplink resources and the unavailability of at least one set of downlink resources from the second signaling information on the scheduled first communication resources. In response, the processor 1405 controls the transceiver 1425 to transmit second signaling information (i.e., unified GC-DCI) to the UE. Here, the second signaling information indicates both the unavailability of the at least one set of uplink resources and the unavailability of the at least one set of downlink resources.

In some embodiments, transmitting the first signaling information includes transmitting first scheduling information (e.g., CG or DCI) to schedule first uplink resources and transmitting second scheduling information (e.g., DCI) to schedule first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH. In some embodiments, the processor 1405 further communicates with the UE using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the transceiver 1425 further sends a RRC configuration. In such embodiments, a time region for which the at least one set of uplink resources is unavailable may be determined from the RRC configuration. In some embodiments, the transceiver 1425 further sends a RRC configuration. In such embodiments, a time region for which the at least one set of downlink resources is unavailable may be determined from the RRC configuration.

In some embodiments, a time region for which the at least one set of uplink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

The memory 1410, in one embodiment, is a computer readable storage medium. In some embodiments, the memory 1410 includes volatile computer storage media. For example, the memory 1410 may include a RAM, including dynamic RAM ("DRAM"), synchronous dynamic RAM ("SDRAM"), and/or static RAM ("SRAM"). In some embodiments, the memory 1410 includes non-volatile computer storage media. For example, the memory 1410 may include a hard disk drive, a flash memory, or any other suitable non-volatile computer storage device. In some embodiments, the memory 1410 includes both volatile and non-volatile computer storage media.

In some embodiments, the memory 1410 stores data related to unified signaling for DL PI and UL CI. For example, the memory 1410 may store parameters, configurations, resource assignments, policies, and the like, as described above. In certain embodiments, the memory 1410 also stores program code and related data, such as an operating system or other controller algorithms operating on the apparatus 1400.

The input device 1415, in one embodiment, may include any known computer input device including a touch panel, a button, a keyboard, a stylus, a microphone, or the like. In some embodiments, the input device 1415 may be integrated with the output device 1420, for example, as a touchscreen or similar touch-sensitive display. In some embodiments, the input device 1415 includes a touchscreen such that text may be input using a virtual keyboard displayed on the touchscreen and/or by handwriting on the touchscreen. In some embodiments, the input device 1415 includes two or more different devices, such as a keyboard and a touch panel.

The output device 1420, in one embodiment, is designed to output visual, audible, and/or haptic signals. In some embodiments, the output device 1420 includes an electronically controllable display or display device capable of outputting visual data to a user. For example, the output device 1420 may include, but is not limited to, an LCD display, an LED display, an OLED display, a projector, or similar display device capable of outputting images, text, or the like to a user. As another, non-limiting, example, the output device 1420 may include a wearable display separate from, but communicatively coupled to, the rest of the network apparatus 1400, such as a smart watch, smart glasses, a heads-up display, or the like. Further, the output device 1420 may be a component of a smart phone, a personal digital assistant, a television, a table computer, a notebook (laptop) computer, a personal computer, a vehicle dashboard, or the like.

In certain embodiments, the output device 1420 includes one or more speakers for producing sound. For example, the output device 1420 may produce an audible alert or notification (e.g., a beep or chime). In some embodiments, the output device 1420 includes one or more haptic devices for producing vibrations, motion, or other haptic feedback. In some embodiments, all or portions of the output device 1420 may be integrated with the input device 1415. For example, the input device 1415 and output device 1420 may form a touchscreen or similar touch-sensitive display. In other embodiments, the output device 1420 may be located near the input device 1415.

The transceiver 1425 includes at least transmitter 1430 and at least one receiver 1435. One or more transmitters 1430 may be used to communicate with the UE, as described herein. Similarly, one or more receivers 1435 may be used to communicate with network functions in the PLMN and/or RAN, as described herein. Although only one transmitter 1430 and one receiver 1435 are illustrated, the network apparatus 1400 may have any suitable number of transmitters 1430 and receivers 1435. Further, the transmitter(s) 1430 and the receiver(s) 1435 may be any suitable type of transmitters and receivers.

Figure 15:
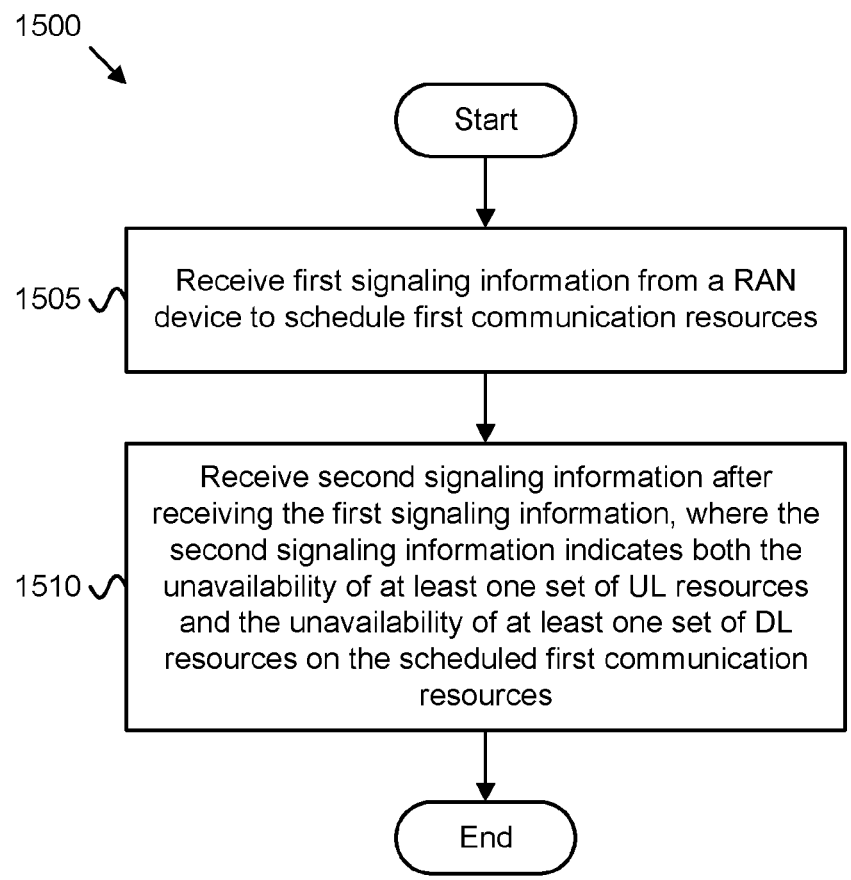
FIG. 15 is a block diagram illustrating one embodiment of a first method for unified signaling for DL PI and UL CI.

FIG. 15 depicts one embodiment of a method 1500 for unified signaling for DL PI and UL CI, according to embodiments of the disclosure. In various embodiments, the method 1500 is performed by a user equipment device in a mobile communication network, such as the remote unit 105, the UE 205, and/or the user equipment apparatus 1300, described above. In some embodiments, the method 1500 is performed by a processor, such as a microcontroller, a microprocessor, a CPU, a GPU, an auxiliary processing unit, a FPGA, or the like.

The method 1500 begins and receives 1505 first signaling information from a Radio Access Network ("RAN") device to schedule first communication resources. The method 1500 includes receiving 1510 second signaling information after receiving the first signaling information, where the second signaling information indicates both unavailability of at least one set of uplink resources and unavailability of at least one set of downlink resources on the scheduled first communication resources. The method 1500 ends.

Figure 16:
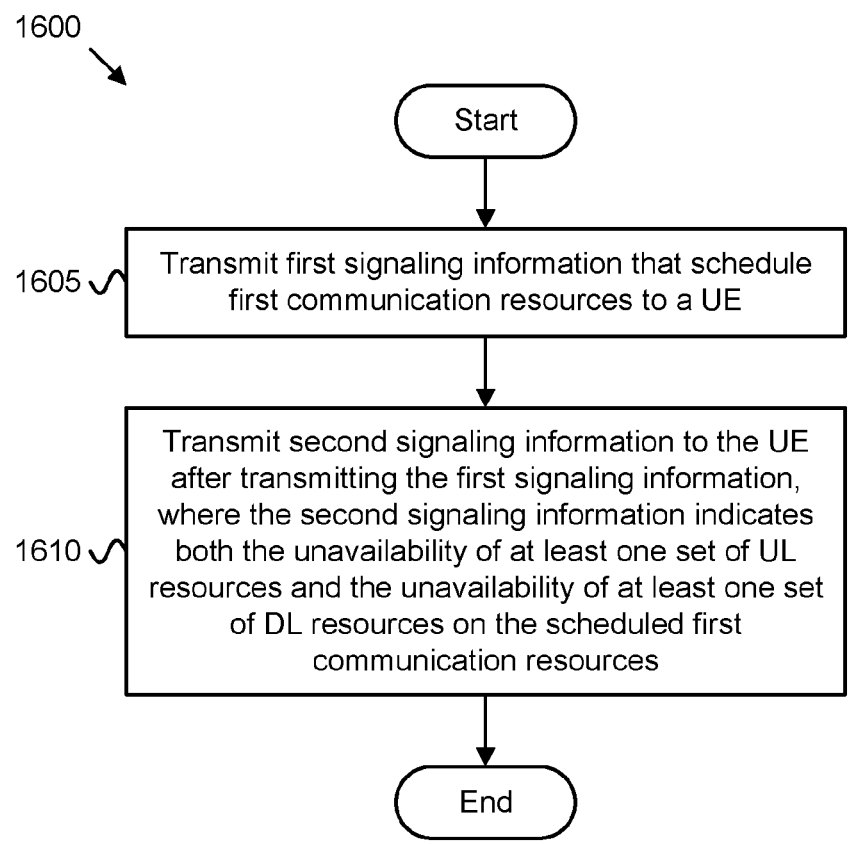
FIG. 16 is a block diagram illustrating one embodiment of a second method for unified signaling for DL PI and UL CI.

FIG. 16 depicts one embodiment of a method 1600 for unified signaling for DL PI and UL CI, according to embodiments of the disclosure. In various embodiments, the method 1600 is performed by a radio access network device, such as the base unit 121, the RAN node 210, and/or the network apparatus 1400, described above. In some embodiments, the method 1600 is performed by a processor, such as a microcontroller, a microprocessor, a CPU, a GPU, an auxiliary processing unit, a FPGA, or the like.

The method 1600 begins and transmits 1605 first signaling information that schedule first communication resources to a UE. The method 1600 includes transmitting 1610 second signaling information to the UE after transmitting the first signaling information, where the second signaling information indicates both unavailability of at least one set of uplink resources and unavailability of at least one set of downlink resources on the scheduled first communication resources. The method 1600 ends.

Disclosed herein is a first apparatus for unified signaling for DL PI and UL CI, according to embodiments of the disclosure. The first apparatus may be implemented by a user equipment device in a mobile communication network, such as the remote unit 105, the UE 205, and/or the user equipment apparatus 1300, described above. The first apparatus includes a processor and a transceiver that receives first signaling information from a RAN device to schedule first communication resources and receives second signaling information (i.e., unified GC-DCI) after receiving the first signaling information. Here, the processor determines unavailability of at least one set of uplink resources and unavailability of at least one set of downlink resources from the second signaling information on the scheduled first communication resources.

In some embodiments, receiving the first signaling information includes receiving first scheduling information (e.g., CG or DCI) that schedules first uplink resources and receiving second scheduling information (e.g., CG or DCI) that schedules first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH.

In some embodiments, the processor monitors for the group-common unified DCI in response to a ratio of uplink subcarrier spacing to downlink subcarrier spacing being below a threshold value. In some embodiments, the processor monitors for the group-common unified DCI in response to a subcarrier spacing associated with the PDCCH being above a threshold value (e.g., monitors for unified DCI for UL CI and DL PI when high SCS is utilized).

In some embodiments, the processor suspends monitoring of certain signaling information in response to determining to monitor for the group-common unified DCI. Here, the certain signaling information may be signaling information transmitted by DCI format to indicate uplink cancellation (e.g., DCI format 2_4) and/or signaling information transmitted by DCI format to indicate downlink preemption (e.g., DCI format 2_1).

In some embodiments, the processor further communicates with the RAN using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the transceiver further receives a RRC configuration. In such embodiments, a time region for which the at least one set of uplink resources is unavailable may be determined from the RRC configuration. In some embodiments, the transceiver further receives a RRC configuration. In such embodiments, a time region for which the at least one set of downlink resources is unavailable may be determined from the RRC configuration.

In some embodiments, a time region for which the at least one set of uplink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

Disclosed herein is a first method for unified signaling for DL PI and UL CI, according to embodiments of the disclosure. The first method may be performed by a user equipment device in a mobile communication network, such as the remote unit 105, the UE 205, and/or the user equipment apparatus 1300, described above. The first method includes receiving first signaling information from a RAN device to schedule first communication resources and receiving second signaling information after receiving the first signaling information, where the second signaling information indicates both unavailability of at least one set of uplink resources and unavailability of at least one set of downlink resources on the scheduled first communication resources.

In some embodiments, receiving the first signaling information includes receiving first scheduling information (e.g., CG or DCI) that schedules first uplink resources and receiving second scheduling information (e.g., CG or DCI) that schedules first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH.

In some embodiments, the first method includes monitoring for the group-common unified DCI in response to a ratio of uplink subcarrier spacing to downlink subcarrier spacing being below a threshold value. In certain embodiments, the first method includes monitoring for the group-common unified DCI in response to a subcarrier spacing associated with the PDCCH being above a threshold value (e.g., monitors for unified DCI for UL CI and DL PI when high SCS is utilized).

In some embodiments, the first method includes suspending monitoring of certain signaling information in response to determining to monitor for the group-common unified DCI. Here, the certain signaling information may be signaling information transmitted by DCI format to indicate uplink cancellation (e.g., DCI format 2_4) and/or signaling information transmitted by DCI format to indicate downlink preemption (e.g., DCI format 2_1).

In some embodiments, the first method further includes communicating with the RAN using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the first method includes receiving a RRC configuration. In such embodiments, a time region for which the at least one set of uplink resources is unavailable may be determined from the RRC configuration. In some embodiments, the first method includes receiving a RRC configuration. In such embodiments, a time region for which the at least one set of downlink resources is unavailable may be determined from the RRC configuration.

In some embodiments, a time region for which the at least one set of uplink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

Disclosed herein is a second apparatus for unified signaling for DL PI and UL CI, according to embodiments of the disclosure. The second apparatus may be implemented by a RAN node in a mobile communication network, such as the base unit 121, the RAN node 210, and/or the network apparatus 1400, described above. The second apparatus includes a transceiver that transmits first signaling information that schedule first communication resources to a UE and a processor that determines, i.e., after transmitting the first signaling information, the unavailability of at least one set of uplink resources and the unavailability of at least one set of downlink resources from the second signaling information on the scheduled first communication resources. The transceiver transmits second signaling information (i.e., unified GC-DCI) to the UE. Here, the second signaling information indicates both the unavailability of the at least one set of uplink resources and the unavailability of the at least one set of downlink resources.

In some embodiments, transmitting the first signaling information includes transmitting first scheduling information (e.g., CG or DCI) to schedule first uplink resources and transmitting second scheduling information (e.g., DCI) to schedule first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH. In some embodiments, the processor further communicates with the UE using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the transceiver further sends a RRC configuration. In such embodiments, a time region for which the at least one set of uplink resources is unavailable may be determined from the RRC configuration. In some embodiments, the transceiver further sends a RRC configuration. In such embodiments, a time region for which the at least one set of downlink resources is unavailable may be determined from the RRC configuration.

In some embodiments, a time region for which the at least one set of uplink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of: the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

Disclosed herein is a second method for unified signaling for DL PI and UL CI, according to embodiments of the disclosure. The second method may be performed by a RAN node in a mobile communication network, such as the base unit 121, the RAN node 210, and/or the network apparatus 1400, described above. The second method includes transmitting first signaling information to schedule first communication resources to a UE and transmitting second signaling information to the UE after transmitting the first signaling information, where the second signaling information indicates both unavailability of at least one set of uplink resources and unavailability of at least one set of downlink resources on the scheduled first communication resources.

In some embodiments, transmitting the first signaling information includes transmitting first scheduling information (e.g., CG or DCI) to schedule first uplink resources and transmitting second scheduling information (e.g., CG or DCI) to schedule first downlink resources. In such embodiments, the second signaling information indicates both unavailability of at least a portion of the first uplink resources and unavailability of at least a portion of the first downlink resources. In one embodiment, the first scheduling information and second scheduling information are both contained in the same DCI, e.g., using a unified scheduling DCI format. In another embodiment, the first scheduling information and second scheduling information are contained in separate DCI. In certain embodiments, at least one of the first scheduling information and the second scheduling information is a configured grant (i.e., of semi-persistent resources).

In some embodiments, the second signaling information is transmitted by group-common unified DCI format. In such embodiments, the unavailability indication of the at least one set of uplink resources may contain an uplink cancellation indication and the unavailability indication of the at least one set of downlink resources may contain a downlink preemption indication. In certain embodiments, the second signaling information is received on a PDCCH. In some embodiments, the second method includes communicating with the UE using a remainder of the first communication resources, where the first communication resources do not include the at least one set of uplink resources and the at least one set of downlink resources.

In some embodiments, a time region for which the at least one set of uplink resources is unavailable is determined from a monitoring periodicity associated with the second signaling information. In some embodiments, a time region for which the at least one set of downlink resources is unavailable is determined from a monitoring periodicity associated with the second signaling information.

In some embodiments, the second method includes transmitting a RRC configuration. In such embodiments, a time region for which the at least one set of uplink resources is unavailable may be determined from the RRC configuration. In some embodiments, the second method includes transmitting a RRC configuration. In such embodiments, a time region for which the at least one set of downlink resources is unavailable may be determined from the RRC configuration.

In some embodiments, a time region for which the at least one set of uplink resources is unavailable is defined using at least one of the time of receiving the second signaling information, communication resources used for monitoring for the second signaling information, a monitoring occasion when the second signaling information is received, and control resource set containing the second signaling information (i.e., and possibly an additional time offset).

In some embodiments, a time region for which the at least one set of downlink resources is unavailable is defined using at least one of the time of receiving the second signaling information, communication resources used for monitoring for the second signaling information, a monitoring occasion when the second signaling information is received, and control resource set containing the second signaling information (i.e., and possibly an additional time offset).

In some embodiments, the second signaling information indicates a first time-frequency resource set for which the at least one set of uplink resources is unavailable and additionally (i.e., separately) indicates a second time-frequency resource set for which the at least one set of downlink resources is unavailable. In other embodiments, the second signaling information indicates a first time-frequency resource set which corresponds to both the at least one set of uplink resources and the at least one set of downlink resources.

In some embodiments, the second signaling information contains at least one TCI state containing information on a spatial filter associated with the at least one set of uplink resources. In such embodiments, the at least one set of uplink resources is only unavailable for the associated TCI state. In some embodiments, the second signaling information contains at least one TCI state containing information on a spatial filter associated with the at least one set of downlink resources. In such embodiments, the at least one set of downlink resources is only unavailable for the associated TCI state.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE"), comprising:
   at least one memory;
   at least one processor coupled with the at least one memory and configured to cause the UE to:
   receive first signaling information from a base station to schedule first communication resources;
   monitor a Physical Downlink Control Channel ("PDCCH") for second signaling information in response to at least one of:
      a ratio of uplink subcarrier spacing and downlink subcarrier spacing satisfying a first threshold value; or
      a subcarrier spacing associated with the PDCCH satisfying a second threshold value;
   receive the second signaling information based on monitoring the PDCCH; and
   determine, based on the second signaling information, an unavailability of at least one set of uplink resources and an unavailability of at least one set of downlink resources on the first communication resources.

2. The UE of claim 1, wherein the second signaling information is transmitted by group-common unified downlink control information ("DCI") format, wherein an unavailability indication associated with the at least one set of uplink resources comprises an uplink cancellation indication, wherein an unavailability indication associated with the at least one set of downlink resources comprises a downlink preemption indication.

3. The UE of claim 2, wherein the second signaling information is received on the physical downlink control channel ("PDCCH").

4. The UE of claim 1, wherein the at least one processor is configured to cause the UE to suspend monitoring of the second signaling information in response to determining to monitor for group-common unified downlink control information ("DCI"), wherein the second signaling information comprises at least one of:
- signaling information transmitted by DCI format to indicate uplink cancellation,
- signaling information transmitted by DCI format to indicate downlink preemption,
- or a combination thereof.

5. The UE of claim 1, wherein the at least one processor is configured to cause the UE to communicate with the base station using a remainder of the first communication resources, wherein the first communication resources do not include the at least one set of uplink resources and the at least one set of downlink resources.

6. The UE of claim 1, wherein a time region for which the at least one set of uplink resources is unavailable is determined from a monitoring periodicity associated with the second signaling information.

7. The UE of claim 1, wherein the at least one processor is configured to cause the UE to receive a Radio Resource Control ("RRC") configuration, wherein a time region for which the at least one set of uplink resources is unavailable is determined from the RRC configuration.

8. The UE of claim 1, wherein a time region for which the at least one set of uplink resources is unavailable is defined using at least one of:
- the time of receiving the second signaling information,
- second communication resources used for monitoring for the second signaling information,
- a monitoring occasion when the second signaling information is received,
- control resource set containing the second signaling information,
- or a combination thereof.

9. The UE of claim 1, wherein the second signaling information indicates a first time-frequency resource set for which the at least one set of uplink resources is unavailable, wherein the second signaling information additionally indicates a second time-frequency resource set for which the at least one set of downlink resources is unavailable.

10. The UE of claim 1, wherein the second signaling information indicates a first time-frequency resource set which corresponds to both the at least one set of uplink resources and the at least one set of downlink resources.

11. The UE of claim 1, wherein the second signaling information comprises at least one Transmission Configuration Indicator ("TCI") state containing information on a spatial filter associated with the at least one set of uplink resources, wherein the at least one set of uplink resources is only unavailable for the associated TCI state.

12. The UE of claim 1, wherein the second signaling information comprises at least one Transmission Configuration Indicator ("TCI") state containing information on a spatial filter associated with the at least one set of downlink resources, wherein the at least one set of downlink resources is only unavailable for the associated TCI state.

13. The UE of claim 1, wherein the at least one processor is configured to cause the UE to suspend monitoring of the second signaling information in response to determining to monitor for group-common unified downlink control information ("DCI").

14. A method performed by a User Equipment ("UE"), the method comprising:
- receiving first signaling information from a base station to schedule first communication resources;
- monitoring a Physical Downlink Control Channel ("PDCCH") for second signaling information in response to at least one of:
  - a ratio of uplink subcarrier spacing and downlink subcarrier spacing satisfying a first threshold value; or
  - a subcarrier spacing associated with the PDCCH satisfying a second threshold value;
- receiving the second signaling information after receiving the first signaling information; and
- determining, based on the second signaling information, an unavailability of at least one set of uplink resources on the first communication resources or an unavailability of at least one set of downlink resources from the second signaling information on the first communication resources.

15. A base station, comprising:
at least one memory; and
at least one processor coupled with the at least one memory and configured to cause the base station to:
- transmit first signaling information to schedule first communication resources to a User Equipment ("UE"); and
- transmit, on a Physical Downlink Control Channel ("PDCCH"), second signaling information to the UE in response to at least one of:
  - a ratio of uplink subcarrier spacing and downlink subcarrier spacing satisfying a first threshold value; or
  - a subcarrier spacing associated with the PDCCH satisfying a second threshold value,
- wherein the second signaling information indicates both an unavailability of at least one set of uplink resources and an unavailability of at least one set of downlink resources on the first communication resources.

16. The base station of claim 15, wherein the second signaling information comprises at least one Transmission Configuration Indicator ("TCI") state containing information on a spatial filter associated with the at least one set of uplink resources, wherein the at least one set of uplink resources is only unavailable for the associated TCI state.

17. The base station of claim 15, wherein the second signaling information comprises at least one Transmission Configuration Indicator ("TCI") state containing information on a spatial filter associated with the at least one set of downlink resources, wherein the at least one set of downlink resources is only unavailable for the associated TCI state.

18. The base station of claim 15, wherein the second signaling information is transmitted by group-common unified downlink control information ("DCI") format, wherein unavailability indication associated with the at least one set of uplink resources comprises an uplink cancellation indication, wherein unavailability indication associated with the at least one set of downlink resources comprises a downlink preemption indication.

19. The base station of claim 15, wherein the second signaling information indicates a first time-frequency resource set for which the at least one set of uplink resources is unavailable, wherein the second signaling information additionally indicates a second time-frequency resource set for which the at least one set of downlink resources is unavailable.

20. The base station of claim 15, wherein the second signaling information indicates a first time-frequency resource set which corresponds to both the at least one set of uplink resources and the at least one set of downlink resources.

* * * * *